July 24, 1962 A. H. FAULKNER 3,046,350

AUTOMATIC ELECTRONIC TELEPHONE SYSTEM

Original Filed Aug. 23, 1955 15 Sheets-Sheet 1

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 2

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 3

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 4

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 5

INVENTOR.
ALFRED H. FAULKNER

BY E. R. Sipe

ATTY

July 24, 1962 A. H. FAULKNER 3,046,350

AUTOMATIC ELECTRONIC TELEPHONE SYSTEM

Original Filed Aug. 23, 1955 15 Sheets-Sheet 6

INVENTOR.
ALFRED H. FAULKNER

BY C. R. Sipe

ATTY

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 8

INVENTOR.
ALFRED H. FAULKNER
BY C. R. Sipe
ATTY

July 24, 1962 A. H. FAULKNER 3,046,350

AUTOMATIC ELECTRONIC TELEPHONE SYSTEM

Original Filed Aug. 23, 1955 15 Sheets-Sheet 9

INVENTOR.
ALFRED H. FAULKNER
BY C. R. Sipe
ATTY

INVENTOR.
ALFRED H. FAULKNER
BY C. R. Sipe
ATTY

AUTOMATIC ELECTRONIC TELEPHONE SYSTEM

Original Filed Aug. 23, 1955

INVENTOR.
ALFRED H. FAULKNER
BY C. R. Sipe
ATTY

AUTOMATIC ELECTRONIC TELEPHONE SYSTEM

Original Filed Aug. 23, 1955

15 Sheets-Sheet 12

INVENTOR.
ALFRED H. FAULKNER
BY C. R. Sipe
ATTY

INVENTOR.
ALFRED H. FAULKNER
BY C. R. Sipe
ATTY

AUTOMATIC ELECTRONIC TELEPHONE SYSTEM

Original Filed Aug. 23, 1955 15 Sheets-Sheet 14

INVENTOR.
ALFRED H. FAULKNER
BY C. R. Sipe
ATTY

AUTOMATIC ELECTRONIC TELEPHONE SYSTEM

Original Filed Aug. 23, 1955 15 Sheets-Sheet 15

INVENTOR.
ALFRED H. FAULKNER
BY C. R. Sipes
ATTY.

3,046,350
Patented July 24, 1962

3,046,350
AUTOMATIC ELECTRONIC TELEPHONE SYSTEM

Alfred H. Faulkner, Redondo Beach, Calif., assignor to Automatic Electric Laboratories, Inc., a corporation of Delaware Original application Aug. 23, 1955, Ser. No. 530,085, now Patent No. 2,931,863, dated Apr. 5, 1960. Divided and this application Dec. 11, 1958, Ser. No. 779,598
26 Claims. (Cl. 179—18)

This invention relates to automatic electronic telephone systems and particularly to an electronic telephone system utilizing semiconductor diodes and transistors.

A general object of the invention is to provide an improved automatic telephone system for selectively establishing a two-way communication path between any two telephone lines in the system.

Another object of the invention is to provide an improved automatic telephone system utilizing semiconductor diodes and transistors to perform routing and switching operations.

Another object of the invention is to provide in an automatic telephone system transistor circuits responsive to line identifying signals for selectively completing connections between subscriber lines.

A further object of the invention is to provide an improved automatic telephone system employing time multiplex means for signal transmission. The aspect of the invention relating to the multiplex signal transimission proper has been claimed in my co-pending application Serial No. 530,085, filed August 23, 1955, now Patent No. 2,931,863, of which the present specification is a division.

A further object of the invention is to provide an automatic telephone system having an improved electronic switching matrix for selectively connecting any one of the subscriber lines to available switching circuits.

A more specific object of the invention is to provide an electronic telephone system having an improved switching matrix for connecting any one of the subscriber lines to available switching circuits on a pulse multiplex basis.

An additional object of the invention is to provide an improved ringing control circuit.

A more specific object of the invention is to provide an improved ringing control circuit particularly adapted to operate in a substantially electronic telephone system.

A more specific object of the invention is to provide an electronic ringing control circuit substantially in the form of a matrix adapted to test any subscriber line in response to the application thereto of a corresponding timed identity pulse.

Another object of the invention is to provide improved electronic distributor circuits for selectively interconnecting the switching circuits in a telephone system.

A more specific object of the invention is to provide improved electronic distributor circuits for interconnecting switching circuits in a telephone system substantially in the order that the distributor is seized by an incoming switching circuit.

Another object of the invention is to provide an improved line circuit for use in electronic telephone systems.

A more specific object of the invention is to provide an improved electronic line circuit particularly adapted to operate in an electronic telephone system employing pulse multiplex transmission means.

Figure 1:
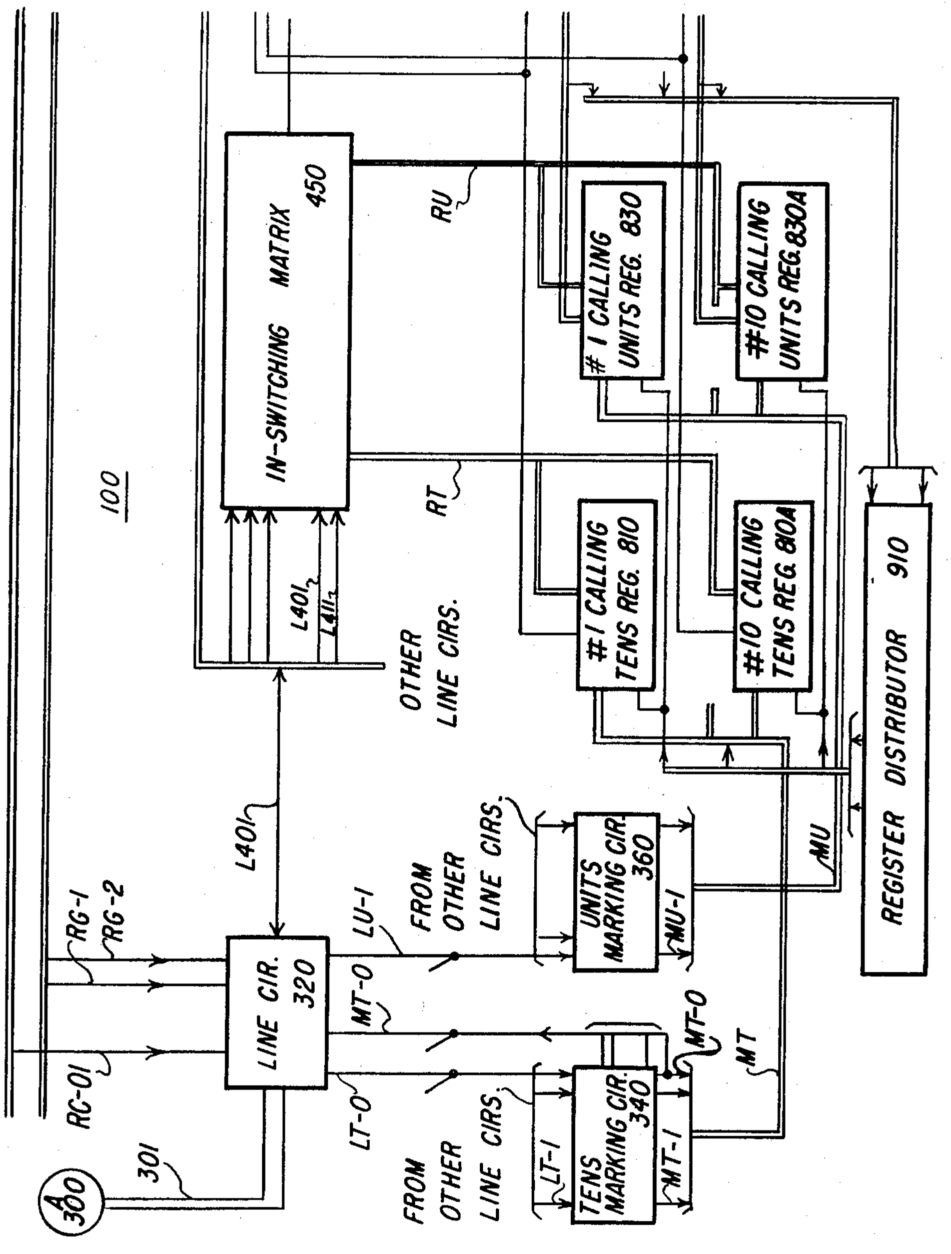
Figures 2, 11:
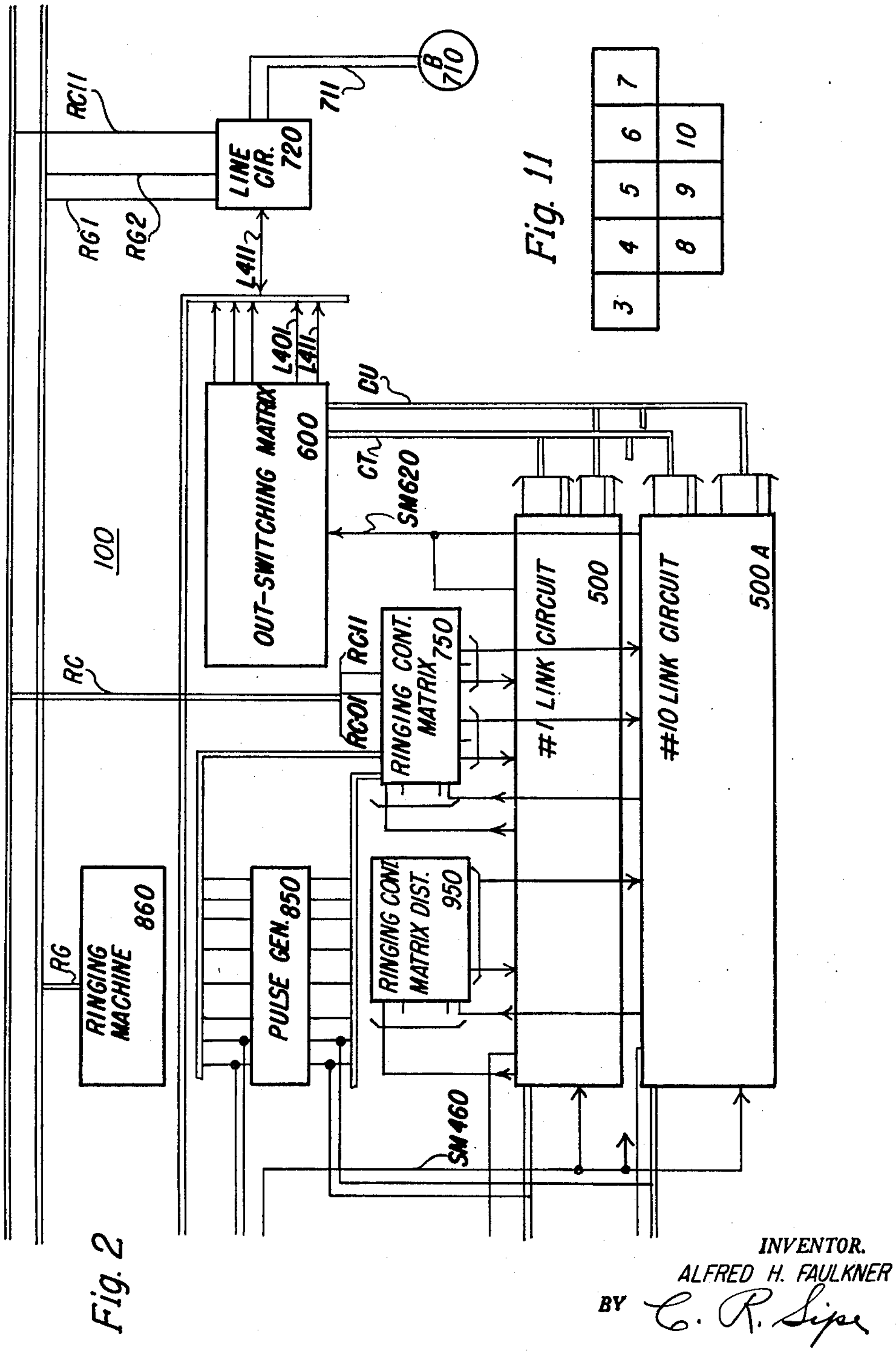
Figure 12:
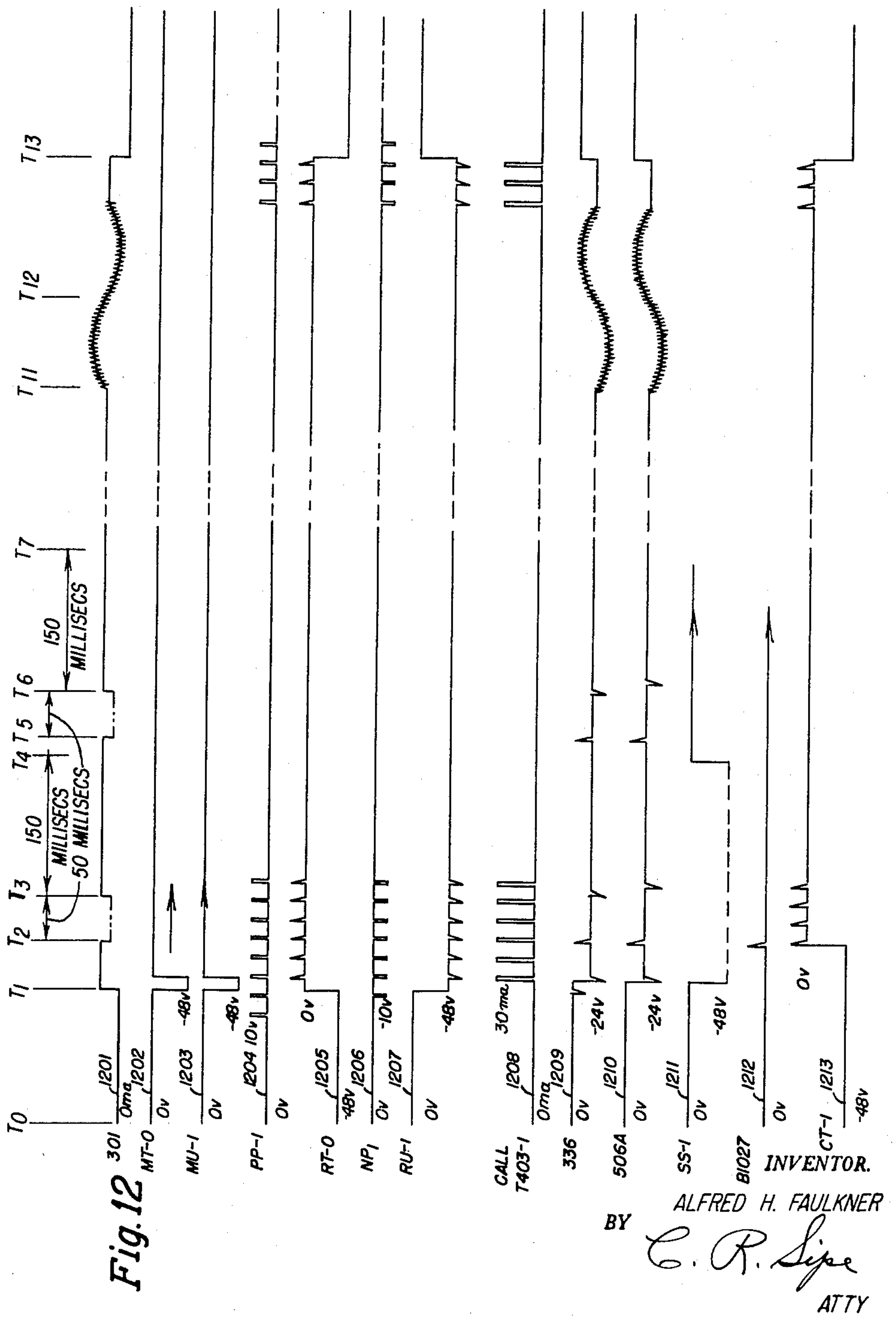
Figure 13:
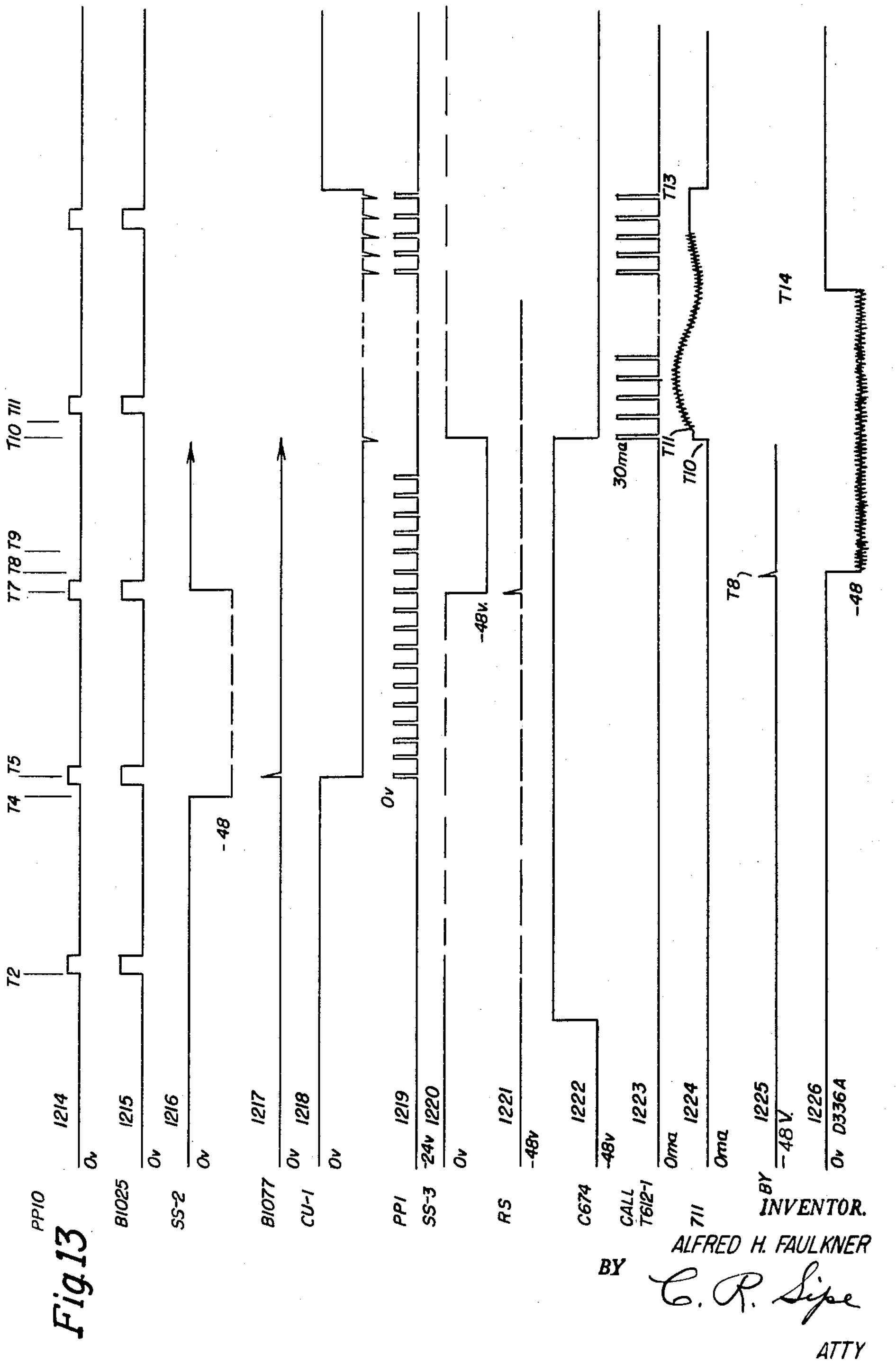
Figure 14:
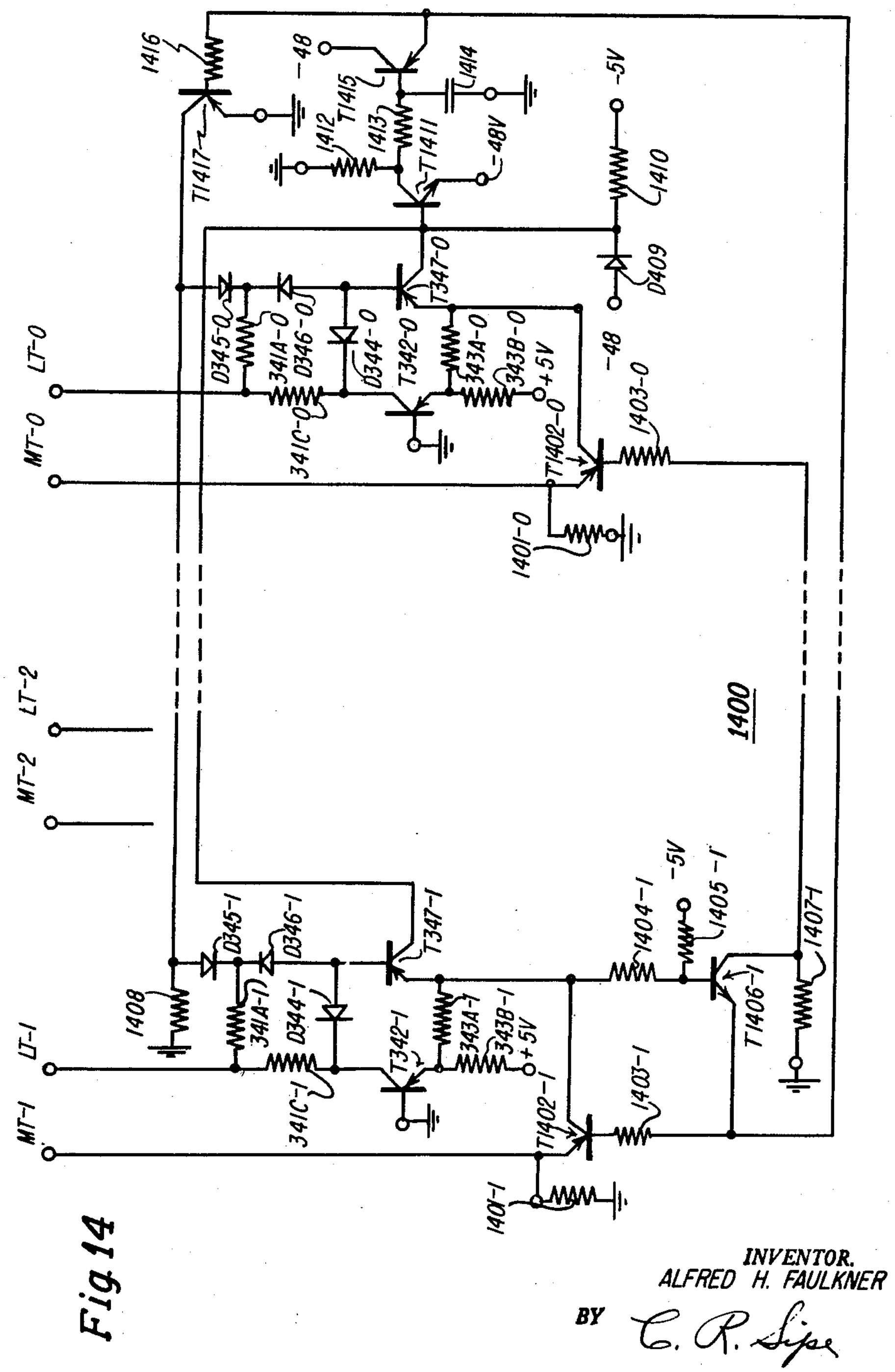
Figure 15:
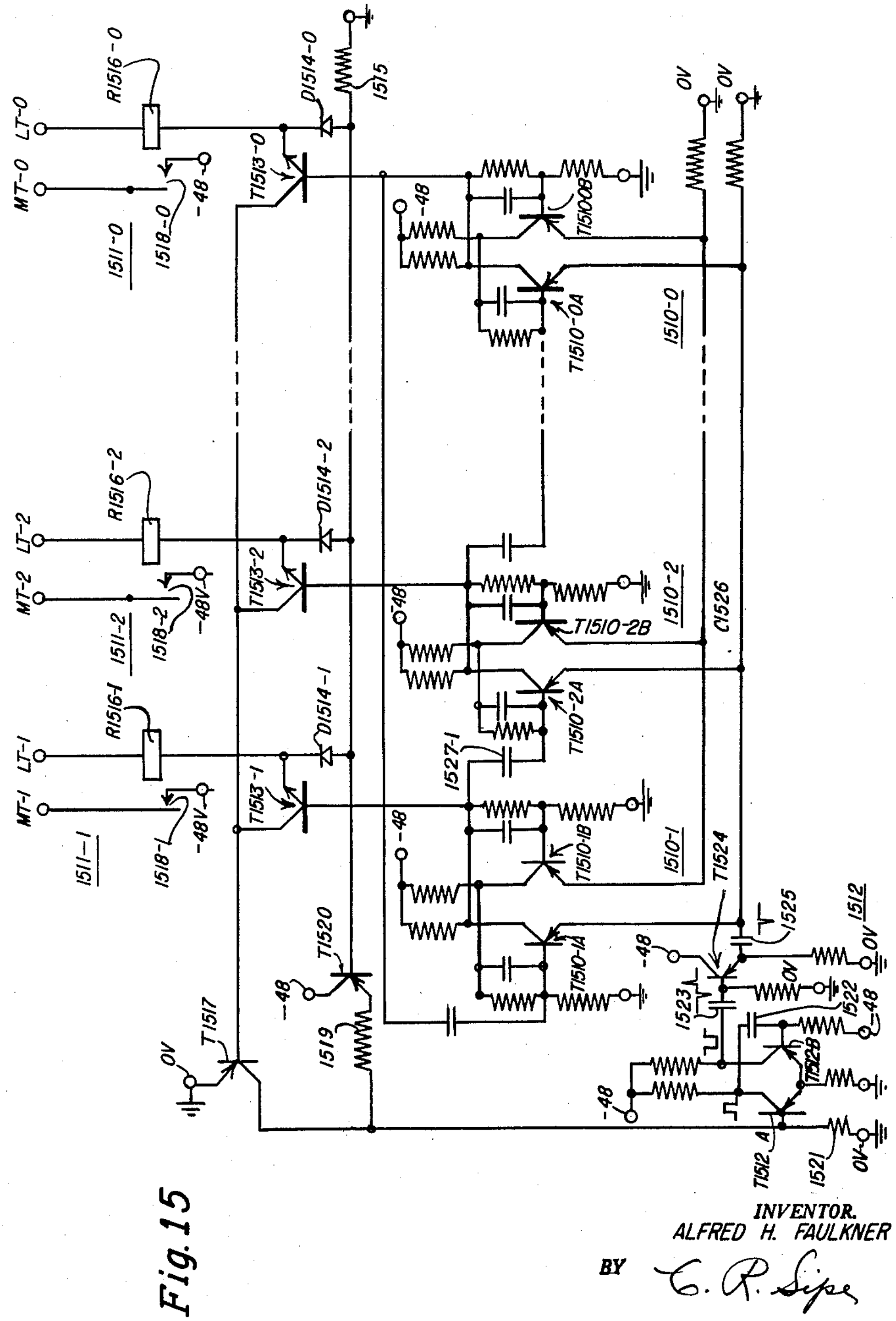

Further objects and features of the invention will be understood from the following description and drawings, forming a part thereof, wherein:

FIGS. 1 and 2 show in block schematic form an automatic telephone system in accordance with the invention;

FIGS. 3 through 10 comprise a detailed circuit diagram of the telephone system illustrated in FIGS. 1 and 2;

FIG. 11 illustrates the manner in which FIGS. 3 through 10 are joined to form the composite circuit diagram;

FIGS. 12 and 13 display a schedule of the voltage and current transformations that take place in the telephone system responsive to the initiation of a cell therein; and, FIGS. 14 and 15 are schematic diagrams of alternative circuits for use in the telephone system of FIGS. 3 through 10.

Figure 16:
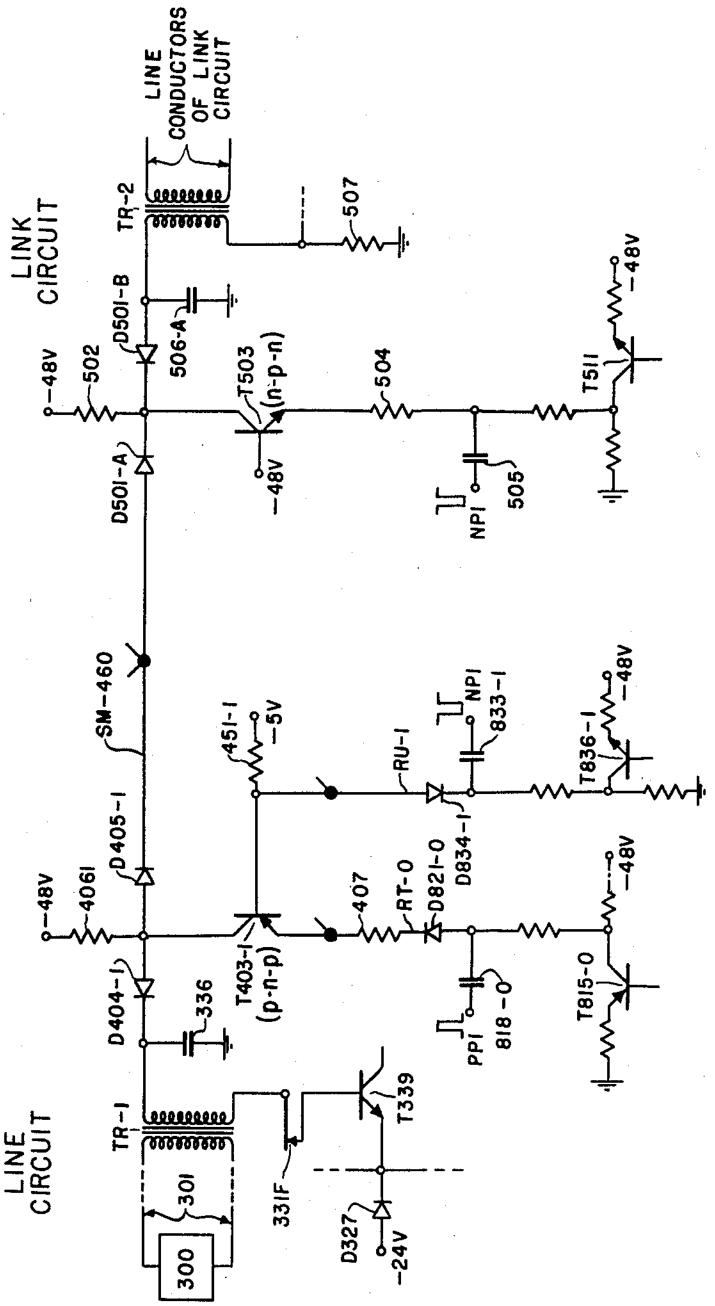

FIG. 16 is a schematic diagram of the two-way transmission system according to the invention.

*Section 1.—The General Arrangement of the Telephone System*

Referring more particularly to FIGS. 1 and 2 which are joined in end-to-end relationship for viewing purposes, there is shown therein in block schematic form, a telephone system 100 operated on a step-by-step basis to establish selectively a two-way communication path between any two subscriber lines, for example, subscriber lines 301 and subscriber line 711, in a group of subscriber lines and to maintain a plurality of such communication paths at a time. The system includes an in-switching matrix 450 which has access via the line circuits, for example, the line circuits 320 and 720, to all of the subscriber lines in the group including the subscriber lines 301 and 711 for connecting the calling ones to the common conductor SM460 on a time division basis. The marking circuits 340 and 360 have access to all of the line circuits in the telephone system and therethrough identify the calling ones of the subscriber lines on a one-at-a-time basis. The identity of a calling line is transferred to an idle one of the pairs calling tens and units registers of which only two pairs 810 and 830, and 810A and 830A are illustrated. A register distributor 910 continuously assigns an idle one of the pairs of registers to the marking circuits. The individual pairs of registers operate to effect connection of the corresponding subscriber lines to the common conductor SM460 during selected periods of a timed cycle which selected periods are reserved to the exclusive use of the register pair by the pulse generator 850.

A number of link circuits 500, etc., which are individually assigned to the pairs of registers and operated in synchronism therewith by the pulse generator 850, each recover the signals of one of the calling subscriber lines from the conductor SM460, identify the called subscriber line and transfer the connection to the common conductor SM620. A ringing control matrix distributor 950 assigns the identify of a called line to the ringing control matrix 750 on a one-at-a-time basis whereby the calling subscriber line is tested for busy or idle condition.

An out-switching matrix 600 has access to all of the subscriber lines in the group and also to the conductor SM620 for completing the connection between calling subscriber lines and called subscriber lines during the selected periods of each timed cycle.

A ringing machine 860 provides means for ringing any idle subscriber line responsive to the test thereof by the ringing control matrix 750.

*Section 2.—The Apparatus Incorporated in the Telephone System*

The several subscriber lines 301, 711, etc., are provided with conventional station apparatus 300, 710, etc., including ringing and speech equipment and line circuits 320, 720, etc. Assuming that the system, as described hereinafter in detail, is adapted to serve one hundred lines, the subscriber lines thereof are identified by two digit directory numbers of which the directory number for subscriber line 301 is arbitrarily chosen to be "01" and the directory number of the subscriber line 711 is arbitrarily chosen to be "11." The line circuits operate to complete a connection between the subscriber line and the in-switching apparatus including the tens marking circuit 340 and the units marking circuit 360 and the in-switching matrix 450 when the line is calling and to complete a connection between the out-switching apparatus including the ringing control matrix 750 and the out-switching matrix 600 and the subscriber line when the line is called.

The tens marking circuit 340 and the units marking circuit 360 are common to all of the line circuits in the telephone system and each include ten interconnected stages respectively numbered from 1 through 0 which stages are operable one at a time over input conductors respectively corresponding to the stages. Thus, each of the stages in the tens marking circuit 340 is connected via the corresponding input conductors LT–1, LT–2, etc., to the groups of line circuits for which the tens digit of the directory number corresponds to the number of the stage. By way of example, the last or "0" stage in the tens marking circuit 340 is connected via tens conductor LT–0 in multiple to the line circuits (including the line circuit 320) of the subscriber lines for which the tens digit of the directory number is "0." Similarly, each of the stages in the units marking circuit 360 is connected via the input conductors LU–1, LU–2, etc., to the groups of line circuits for which the units digit of the directory number of the subscriber lines corresponds to the number of stage. By way of example, the first or "1" stage of the units marking circuit 360 is connected via the units conductor LU–1 in multiple to the line circuits (including the line circuit 320) of the subscriber lines for which the units digit of the directory number is "1."

In order to provide markings from the circuits, the tens marking circuit 340 includes the output conductors MT–1, MT–2, etc., respectively corresponding to the stages and which are connected to the corresponding groups of line circuits and to the multiple conductor trunk line MT extending to the calling tens registers 810, 810A, etc. Specifically, the output conductor MT–0 is connected to the trunk line MT and to the group of line circuits (including the line circuit 320) of the subscriber lines for which the tens digit of the directory number is "0." The latter connection activates the connected line circuits to permit the application of a calling line marking signal on the one of the calling line circuits to the corresponding one of the input conductors LU–1, LU–2, etc., extending to the units marking circuit 360.

In the units marking circuit, the output conductors MU–1, MU–2, etc., are connected to the multiple conductor trunk line MU extending to the calling units registers 830, 830A, etc.

Thus, the initiation of a call on subscriber line 301 causes the tens conductor LT–0 of the line circuit 320 to be marked by a signalling voltage. The LT–0 conductor extends to the "0" stage of a tens marking circuit 340 and when no other stage in the marking circuit is active, a signalling voltage is returned to the line circuit 320 via the tens marking conductor MT–0 to control the line circuit for applying a signalling voltage on the units conductor LU–1 extending to the "1" stage of the units marking circuit 360. The "0" stage in the marking circuit 340 and the "1" stage in the marking circuit 360 are thereby operated and responsive thereto to the conductors MT–0 and MU–1 extending to the calling tens and units registers via the trunks MT and MU, respectively, are marked. In the calling registers, the identity of the one calling line is registered and the marking circuits are subsequently caused to be released from the line circuit of the one calling line in a manner to be described more fully hereinafter.

It is to be noted that the foregoing explanation of the marking of the identity of a calling line is predicated on but one subscriber line in the system initiating a call at any one time. The operation of the tens marking circuit 340 and the units marking circuit 360 is the same even if more than one subscriber line should initiate a call at the same instant except that the marking circuits 340 and 360 provide an order of preference, as explained more fully hereinafter, so that only one calling subscriber line can be identified therein at any one time.

The calling tens and units registers 810 and 830, etc., are arranged in pairs and in addition to registering the identity of a calling subscriber line, each pair selectively operates the in-switching matrix 450 to connect the corresponding calling subscriber line to the single conductor output lead SM460. In the exemplary telephone system there are ten pairs of individually numbered tens registers and units registers which are represened in FIG. 1 by the No. 1 calling tens register 810 and No. 1 calling units register 830, and the No. 10 calling tens register 810A and the No. 10 calling units register 830A. Idle pairs of the registers are assigned to the marking circuits 340 and 360 on a one-at-a-time basis by a register distributor 910. The presence of ten pairs of registers permits the telephone system to handle ten calling lines at a time. The pairs of registers are sequentially activated in timed cycles by pulses applied thereto from the pulse generator 850 whereby the calling subscriber lines identified in any one of the pairs of registers are connected through the register controlled in-switching matrix 450 during the activation periods corresponding to the one calling register pair to the output lead SM460 on a time sharing, or time multiplex basis.

The in-switching matrix 450 comprises a plurality of selectively operative crosspoints respectively corresponding to the subscriber lines in the system for interconnecting individual ones of the subscriber lines to the in-switching matrix output lead SM460. All of the pairs of calling registers having access to all of the cross points and each busied pair of calling registers operates, during its activation periods, the one crosspoint corresponding to the calling subscriber line identified in the pair of calling registers thereby connecting via the corresponding line circuit the calling subscriber line to the output conductor SM460. Immediately after the connection between the calling line and the lead SM460 is completed, the line circuit is operated to remove the marking voltages from the marking circuits 340 and 360 whereby the marking circuits are released therefrom and prepared to identify another calling line.

By way of an example, assume that the calling subscriber line 301 is identified in the marking circuit 340 and 360 and that the corresponding directory number "01" is registered in the idle No. 1 calling registers 810 and 830 arbitrarily assigned thereto by the register distributor 910. Responsive to the registration of the directory number "01" therein the No. 1 calling registers 810 and 830, which are activated in this time multiplex system for one fixed period out of every ten periods, for example, the first five microseconds of a fifty microsecond period, operates during the five microsecond activation periods, the crosspoint in the in-switching matrix 450 corresponding to the calling line identified by the "01" directory number. The operated crosspoint interconnects the matrix output lead SM460 with the calling subscriber line 301 via conductor L401 and the line circuit 320. As soon as the calling subscriber line is connected through to the matrix output conductor SM460, the marking voltage in the line circuit 320 is removed from the LT–0 conductor thereby releasing the marking circuits 340 and 360 and rendering the marking circuits available to identify other calling lines.

The conductor SM460 has access to a plurality of link circuits 500, 500A, etc., respectively corresponding to the pairs of calling registers which link circuits are correspondingly numbered and cyclically activated in synchronism with the corresponding pairs of calling registers. Thus, for example, the No. 1 link circuit 500 is associated with the conductor SM460 during the same five microsecond intervals that the corresponding No. 1 calling registers 810 and 830 connect the subscriber line 301 to the conductor SM460.

Figure 5:
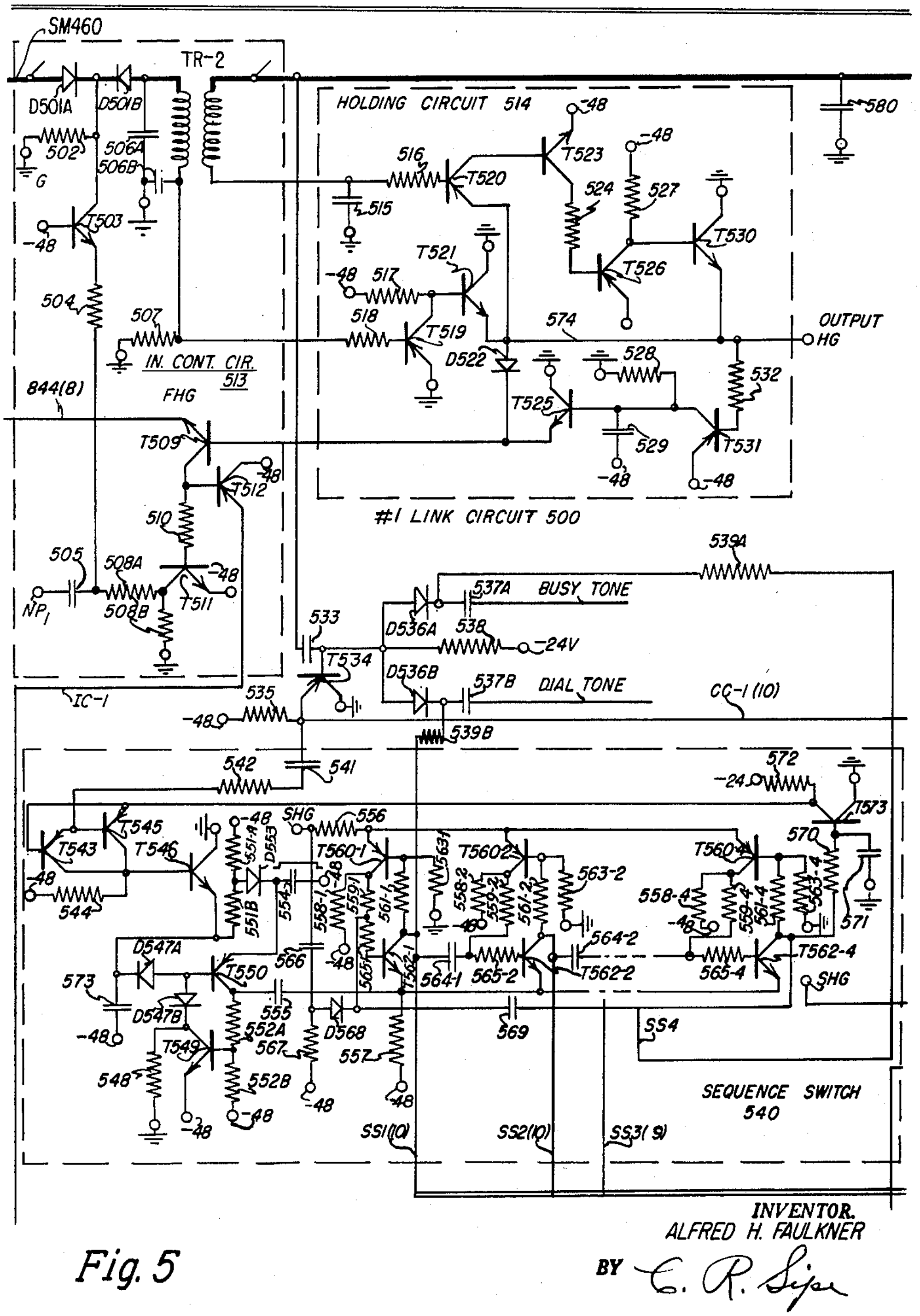
Figure 6:
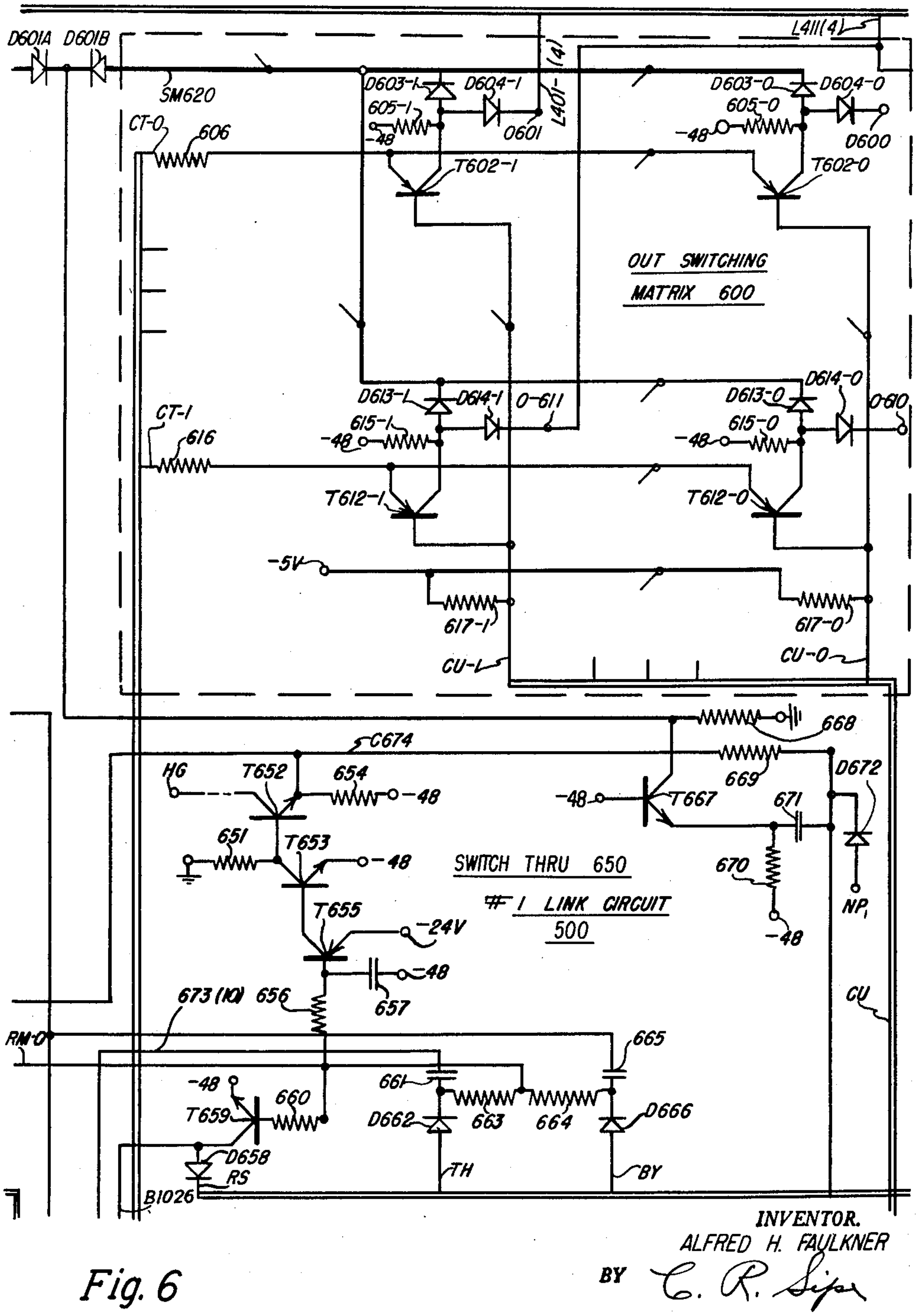
Figure 7:
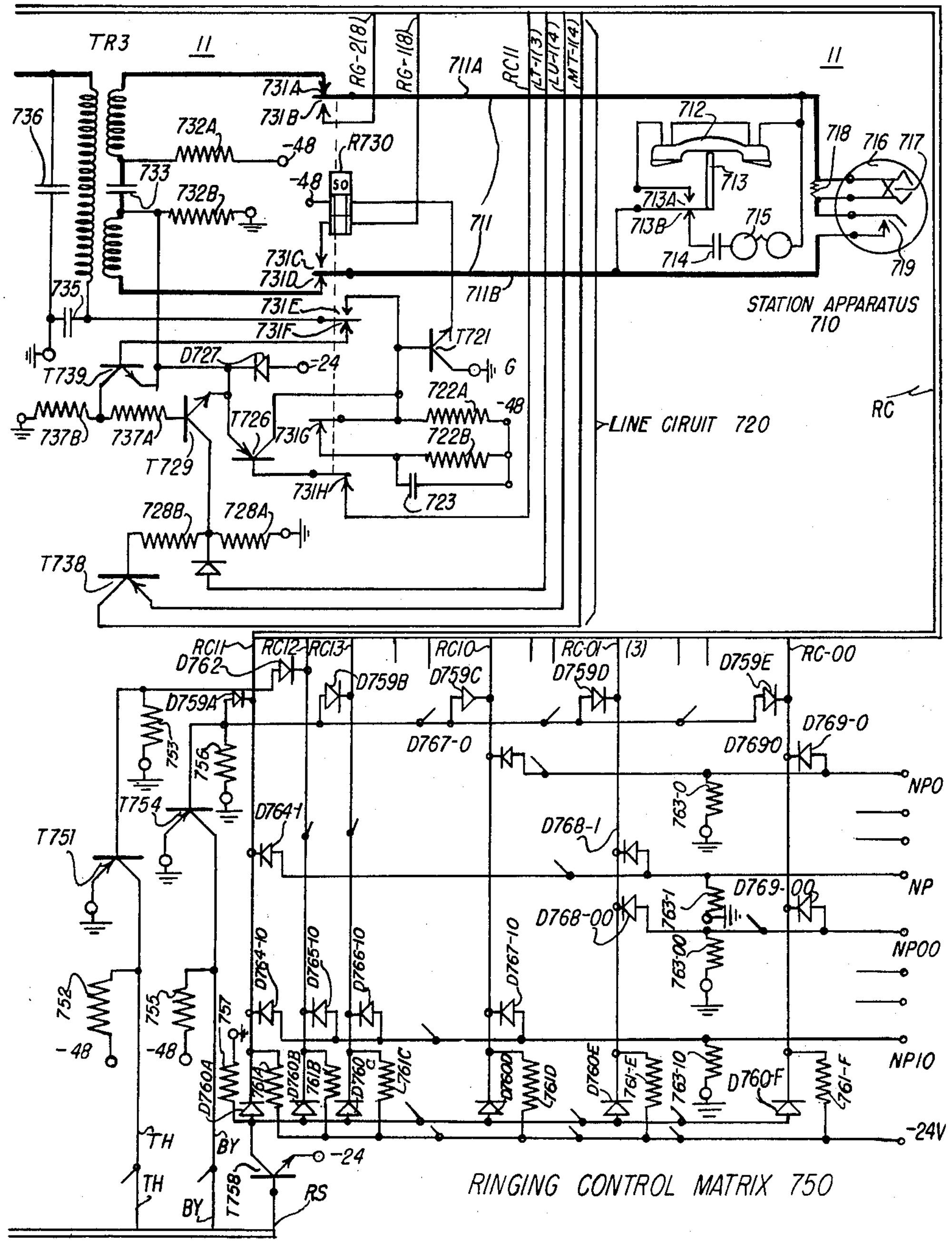
Figure 8:
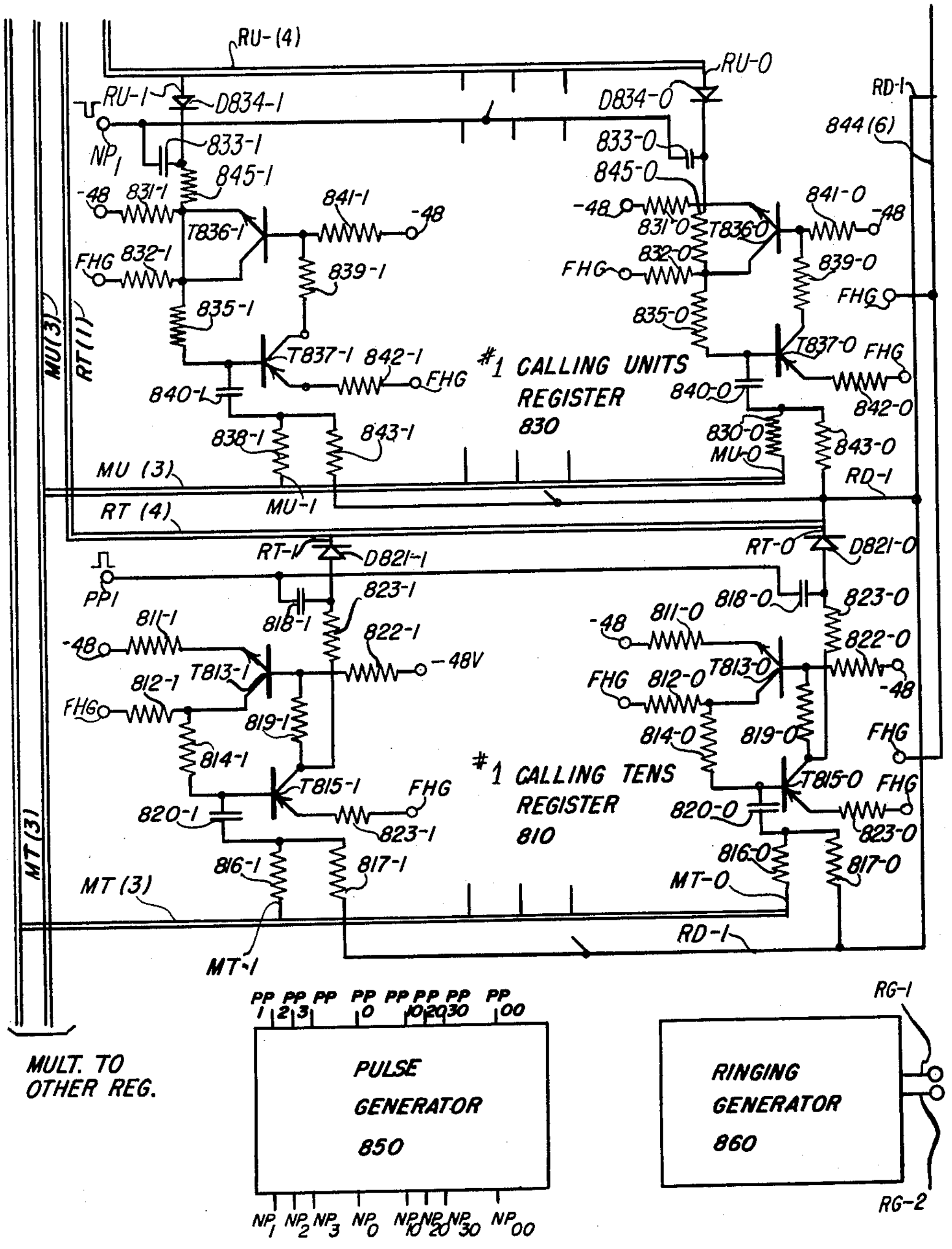
Figure 10:
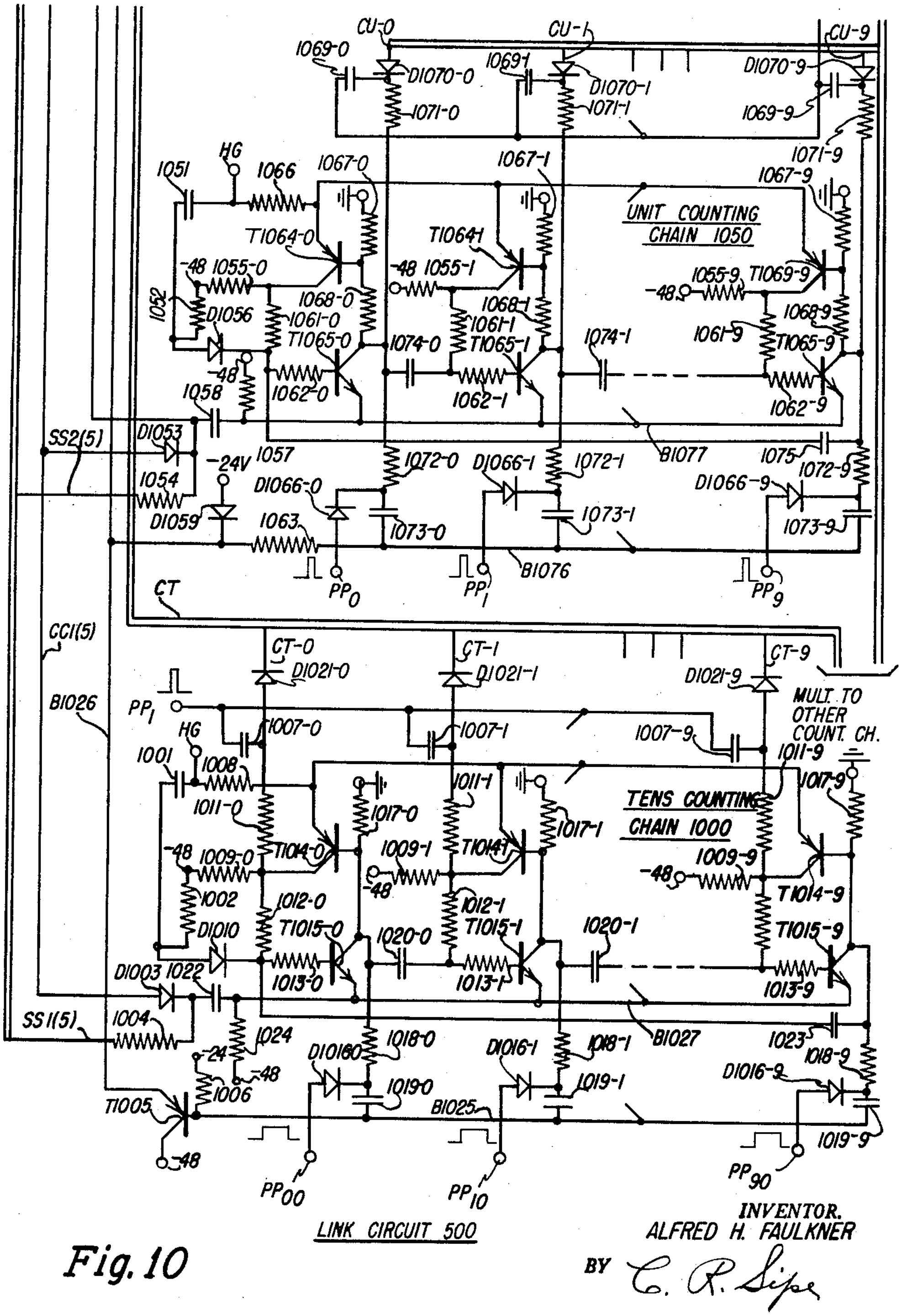

Each of the link circuits has a plurality of individual circuits corresponding to those shown in detail in the No. 1 link circuit 500 of FIGS. 5, 6 and 10 including an input control circuit 513, a holding circuit 514, sequence switch 540, tens counting chain 1000, units counting chain 1050 and a switch-through circuit 650. Common to all of the link circuits are the ringing control matrix distributor 950 and a ringing control matrix 750.

In each of the link circuits, the directory number dialled at the corresponding calling subscriber station is recovered and registered. For example, assuming that the subscriber line 301 initiates a call to the subscriber line 711 identified by the directory number "11," the No. 1 link circuit 500 recovers and registers the directory number "11" transmitted to it via the in-switching matrix 450 and the conductor SM460. Responsive to registration of the dialled directory number in the link circuit 500, the called subscriber line 71, identified by the dialled directory number, is tested to determine whether the line is busy or idle. This testing is accomplished through a ring control matrix 750 which is connected directly to the line circuit 720 of the subscriber line 711 via the conductor RC–11 in the multiple conductor trunk line RC. The link circuits identifying the called subscriber lines are assigned to the ringing control matrix 750 on a one-at-a-time basis by the ringing control matrix distributor 950.

If the called line 711 identified in link circuit 500 is found to be idle by the ringing control matrix 750, the ringing machine 860 is connected to the line circuit 720 thereof via the ringing generator leads RG–1 and RG–2. Further, in response to the answering of the call at the called line, the crosspoint in the outswitching matrix 600 corresponding to the called subscriber line 711 is operated in synchronism with the activation of link circuit 500 so that the conductor SM460 is connected via the link circuit 500, conductor SM620, the out-switching matrix 600, the conductor L411 and the line circuit 720 to the subscriber line 711 during the five microsecond intervals that the calling subscriber line 301 is connected to the conductor SM460. In this manner a connection is completed from the calling subscriber line 301 to the called subscriber line 711.

Should the called line 711 be busy, the link circuit 500 is caused by the ringing control matrix 750 to return a busy signal to the calling line 301 over the line SM460, whereupon, the party at subscriber line 301 may release the connection.

To better understand the mode of operation of the individual circuits in the system, reference will now be made to the FIGS. 3 through 10 arranged as shown in FIG. 11. By way of introduction to the FIGS. 3 through 10, it will be noted that the telephone system is essentially electronic and includes diodes and transistors. The transistors and diodes used in the circuits are preferably of a crystalline type of a semi-conductor material, such as, for example, germanium. The diodes are identified in the drawings by the conventional symbol wherein the electric current flow (as distinguished from electron current flow) is from the anode electrode thereof in the direction of the arrow to the cathode electrode. The transistors used in the circuits are preferably of the junction type and as may be noted from the conventional symbols employed are of n-p-n semi-conductor construction (the arrow on the emitter electrode is pointed away from the base) and of p-n-p semi-conductor construction (the arrow on the emitter electrode is pointed towards the base). The direction of the arrow defines the direction of electric current flow through the emitter.

The features of the telephone system in accordance with the invention will be understood from the following detailed explanation of the operation of the system as shown in FIGS. 3 through 10 and by considering first the initiation of a call at the station 300 on the subscriber line 301.

*Section 3.—Initiation of a Call at the Station 300*

Figure 3:
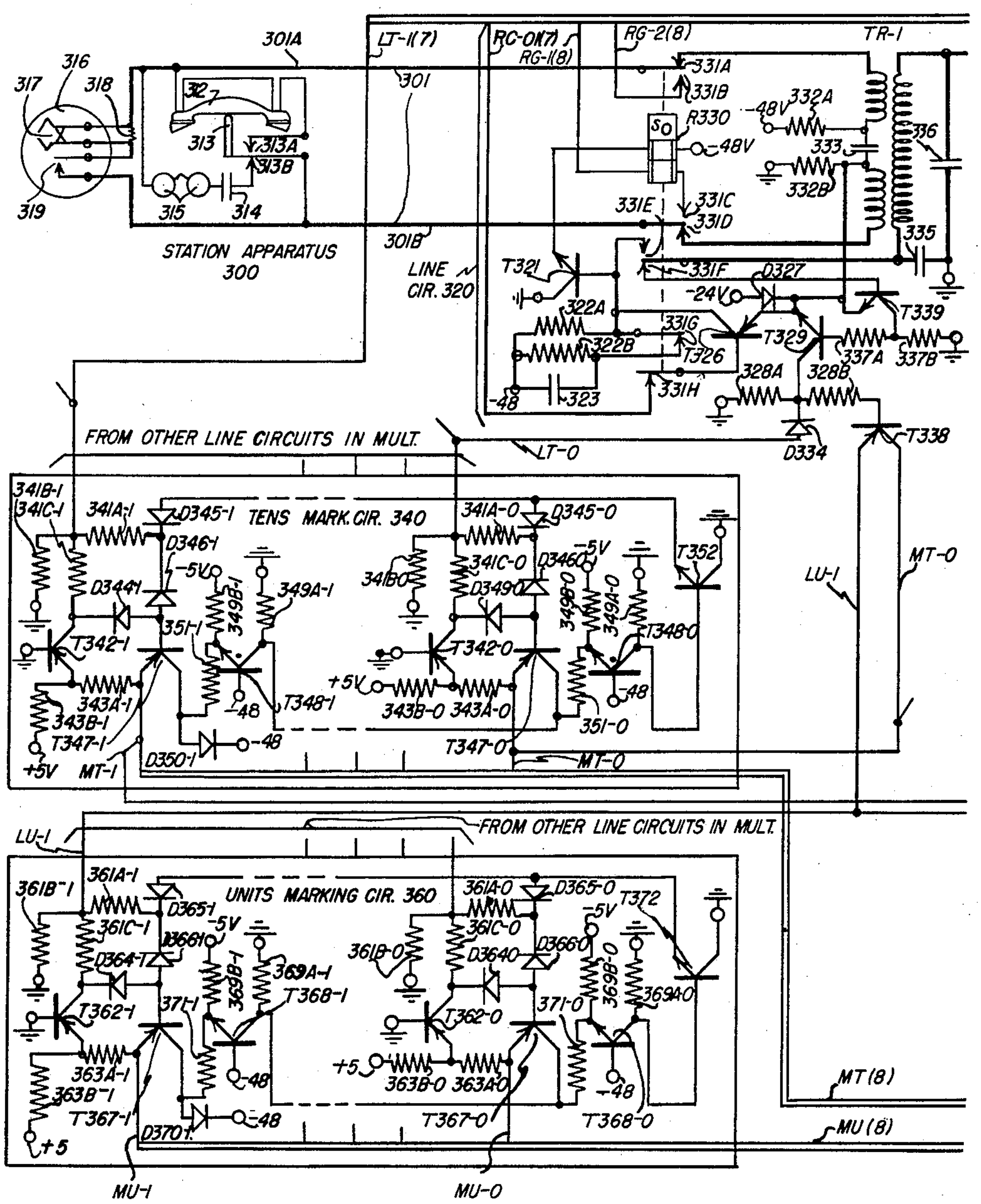

As shown in FIG. 3, each of the subscriber lines 301, etc., comprises a pair of line conductors 301A and 301B, etc., having connected thereacross a calling station 300, etc. The apparatus in station 300 is conventional and includes the telephone instrument 312 and the dial mechanism 316 including the impulse springs 317 shunted by the resistor 318 and the dial off-normal springs 319. Additionally, the station apparatus includes the switch hook 313, the switch hook springs 313A and 313B and the ringer 315 with its associated D.C. blocking capacitor 314.

Assuming that all of the subscriber lines 301, 711, etc., are idle, none of the circuits in the system are operative other than the register distributor 910 which as preselected and assigned, for example, the idle No. 1 calling registers 810 and 830 to the marking circuit 340 and 360, respectively. The current flow through the subscriber line 301 at this time $t_0$ is interrupted, which current flow is illustrated by the curve 1201 in FIG. 12.

When at the time $t_1$ the party at station 300 removes the telephone instrument 312 from the switch hook 313 for the purpose of initiating a call, a circuit is completed from −48 volts in the line circuit 320 through the resistor 332A, the upper primary winding of the transformer TR–1, the contacts 331A, conductor 301A, telephone instrument 312, switch hook contacts 313A, conductor 301B, contacts 331D, the lower primary winding of the transformer TR–1 and the resistor 332B to ground potential. The values of resistors 332A and 332B are balanced with respect to the impedance of the subscriber line and the telephone instrument 312 so that when the circuit is completed, the current flow therethrough will establish at the junction between resistor 332B and the lower winding of the transformer TR–1 at −24 volts. Inasmuch as D.C. loop impedance of the subscriber line 301 and the station 300 may vary, the junction between the resistor 332B and the lower primary winding of the transformer TR–1 is prohibited from going more negative than −24 volts by the −24 volt source connected thereto via the diode D327. This negative voltage on the one terminal of the resistor 332B is applied to the emitter of the transistor T329 thereby rendering this transistor conductive from ground potential via resistors 337A and 337B and through the base-emitter path thereof. The collector electrode is thereupon clamped at −24 volts which voltage is extended to the junction between the resistors 328A and 328B and the diode D334. Responsive to the negative voltage at the junction, the cathode of diode D334 is biased conductive and the transistor T338 is biased at its conductive threshold. Inasmuch as the current flow in the loop is D.C. there is no current flow induced in the primary winding of the transformer and the capacitor 336 connected from one terminal of the secondary winding to ground potential is not charged. As no current flow is provided through the secondary winding or the speech frequency shunting capacitor 335 connected between ground potential and the other terminal of the secondary winding to the base electrode of transistor T339 via contacts 331F, the transistor T339 is nonconductive. Additionally, no current is drawn through the base electrode of transistor T326 via the contacts 331H and conductor RC–01, hence this transistor is also nonconductive.

Thus, at the time $t_1$, the large current flow in the subscriber line 301 caused by the initiation of a call thereon has caused the diode D334 in the line circuit 320 to be biased conductive and the transistor T338 to be raised to conduction threshold thereby marking the subscriber line 301 as calling to the marking circuits 340 via the conductor LT–0 whereby the tens marking circuit 340 and the units marking circuit 360 are operated.

*Section 4.—Operation of the Marking Circuits*

The tens marking circuit 340, and the units marking circuit 360 are identical and each include ten stages operative one at a time of which only the first and last stages of each are illustrated in the circuit diagram of FIG. 3. As pointed out previously, each of the stages in the marking circuit is provided with a separate input and output conductor and is operated only over the input conductor corresponding to the stage. Thus, in the tens marking circuit 340, the first stage is connected in multiple via conductor LT–1 to all line circuits for which tens digit of the directory number of the subscriber line associated therewith is "1" and the stage is therefore known as the "1" stage. Similarly, the input lead LT–0 to the last stage in the tens marking circuit 340 is connected in multiple to the line circuits, including the line circuit 320, for which the tens digit of the directory number of the subscriber line associated therewith is "0" and the stage is therefore known as the "0" stage. The stages in each of the marking circuits are so interconnected that only one stage in each marking circuit may be operative at any given time.

Referring specifically to the tens marking circuit 340, the transistors T342–1 through T342–0 and T348–1 through T348–0 in the stages thereof are normally conductive when no marking is applied to the input conductors thereof and the transistors T347–1 through T347–0 are normally nonconductive whereby no marking is applied to the output conductors of the stages. Responsive to the above described marking on the diode D334 in the line circuit 320, current flows in the conductor LT–0 from the "0" stage thereby operating the "0" stage in a manner described hereinafter and indicating that one of the subscriber lines for which the tens digit of the directory number "0" is calling. The input lead LT–0 to the stage is connected to a junction between the resistors 341A–0, 341B–0 and 341C–0, which junction is normally maintained at the ground potential via the resistor 341B–0. At the time $t_1$, the —24 volts applied to the cathode of the diode D334, renders the diode conductive causing current to flow therethrough and establishing the junction between the resistors 341A–0, 341B–0 and 341C–0 at —24 volts. The potential at this junction biases the base of the transistor T347–0 conductive via the resistor 341A–0 and diode D346–0. The collector and the emitter of transistor T347–0 are thereby clamped at substantially —48 volts causing the transistors T342–0 and T348–0 to become nonconductive at the emitter electrodes thereof. Responsive to nonconduction in transistor T342–0, ground potential is removed from the collector thereof thereby changing the path of the current flow from the base of the transistor T347–0 to the conductor LT–0 to that path through diode D349–0 and the resistor 341C–0. The collector electrode of the now nonconductive transistor T348–0 is maintained at substantially ground potential whereby the base of the transistor T352 is rendered conductive and the emitter electrode is established at substantially ground potential. The ground potential on the emitter electrode of T352 is further extended to all of the diodes D345–1 through D345–0, thereby providing a lower impedance current path to the conductors LT–1 through LT–9 than is available through the nonconductive transistors T347–1 through T347–9. Thus, at the time $t_1$, the "0" stage of the tens marking circuit 340 is rendered conductive and all of the other stages of the marking circuit are temporarily rendered nonconductive and the output conductor MT–0 from the "0" stage connected to the emitter electrode of transistor T347–0 is at —48 volts potential as indicated by curve 1202 in FIG. 12.

The conductor MT–0 extends to the collector electrode at transistor T338 in the line circuit 320 as well as to similar transistors in all other line circuits for which the tens digit of the directory number is "0." Additionally, the conductor MT–0 extends to the assigned tens calling register 810 via trunk MT. It is assumed that at the time $t_1$, only the subscriber line 301 of all of the lines for which the tens digit is "0," is calling and therefore, only the transistor T338 in the line circuit 320 will be at conductive threshold. The —48 volts applied to the collector electrode of the transistor T338 by the conductor MT–0 renders only that transistor conductive thereby clamping the emitter electrode thereof at —48 volts. As the units digit of the directory number of the calling line 301 is "1," the emitter of transistor T338 is connected via conductor LU–1 to the first, or "1," stage, of the units marking circuit 360. In the "1" stage of the units marking circuit 360, the —48 volts applied to the line LU–1 renders the transistor T367–1 conductive and the transistors T362–1 and T368–1 nonconductive in the same manner as described above with reference to the "0" stage in the tens marking circuit 340. Additionally, therein, the collector electrode of transistor T368–1 which is at this time nonconductive, is maintained at substantially ground potential through resistor 369A–1. This ground potential is applied to the collector electrodes of the succeeding transistors T367–2 through T367–0, thereby disabling those transistors and simultaneously biasing the emitter electrodes of the transistors T368–2 through T368–0 nonconductive. Nonconduction in transistor T368–0 renders the transistor T372 conductive and establishes the emitter electrode thereof at ground potential, thereby disabling via the diodes D365–2 through D365–0, all of the stages "2" through "0." The —48 volts at the emitter electrode at the transistor T367–1 is applied to the output terminal MU–1 which is extended to the units calling register 830 via the trunk MU as shown on curve 1203 in FIG. 12.

Should it happen that more than one of the subscriber lines, including subscriber line 301, for which the tens digit of the directory number is "0" be initiating a call at this time, the transistor T338 in the line circuit 320 and the correspondingly biased transistors in the other of the calling line circuits will be rendered conductive by the —48 volts applied thereto over conductor MT–0. As a result, the conductor LU–1 and the corresponding conductors connected to the units marking circuit 360 will be marked by a —48 voltage. However, in this instance only the "1" stage in the marking circuit 360 will be operated because the stages therein operate one at a time as explained and the circuit establishes an order of preference proceeding from the "1" stage through the "0" stage. The other calling subscriber lines are delayed and identified according to the order of preference as the marking circuits 340 and 360 are released by the line circuits.

Thus at the time $t_1$, the tens marking circuit 340 has identified by a marking on the MT–0 conductor that a subscriber line for which the tens digit of the directory number is "0" is calling and the units marking circuit has simultaneously identified by a marking on the MU–1 conductor that a subscriber line for which the units digit of the directory number of "1" is calling. These markings on the MT–0 and MU–1 conductors are extended to the assigned tens register 810 and units register 830, respectively.

*Section 5.—Operation of the No. 1 Calling Registers*

As mentioned previously, it has been assumed that the registers 810 and 830 forming the No. 1 calling register pair were preassigned to the tens and units marking circuits 340 and 360, respectively, by the register distributor 910. The method of assignment will be explained in detail later. Each of the register circuits are made up of ten stages respectively corresponding to an output conductor from a marking circuit. Thus, the calling tens register 810 has ten stages respectively connected to the tens marking circuit output conductor MT–1 through MT–0 and the units register 830 has ten stages respectively connected to the units marking conductors MU–1 through MU–0. In the circuit illustration of FIG. 8, only two stages of each register are illustrated. Additionally, each of the stages in both the tens register 810 and the units register 830 are connected to the register distributor 910 by the conductor RD–1. Responsive to the preselection by the register distributor 910 of the No. 1 calling registers 810 and 830 for operation with the marking circuits 340 and 360 at the time $t_1$, —48 volts is applied to the conductor RD–1 by the register distributor 910. This voltage is connected to all of the stages in the tens register 810 via the resistors 817–1 through 817–0 and to all of the stages in the units register 830 via the resistors 843–1 through 843–0.

In the tens register 810, the conductors MT–1 through MT–0 apply ground potential to the corresponding stages via resistors 816–1 through 816–0, respectively, and the marked conductor MT–0 applies —48 volts to the "0" stage via the resistor 816–0. Similarly in the units register 830, the marked conductor MU–1 applies —48 volts to the "1" stage thereof via resistor 838–1 and the other conductors MU–2 through MU–0 apply ground potential to the corresponding stages via the resistors 838–2 through 838–0, respectively. Thus, the voltage in the tens register 810 at the junction between resistor 816–0 and resistor 817–0 is —32 volts and the voltages at the corresponding junctions in the other stages of the tens register 810 is less than —24 volts. The sudden application of a potential greater than —24 volts (—32 volts) to the capacitor 820–0 causes a negative impulse to be applied to the base of the transistor T815–0 which momentarily renders that transistor conductive. Responsive to the conduction, the emitter and collector electrodes are raised to ground potential. At the same time, the negative pulse is applied to the collector of the transistor T813–0 via the resistor 814–0 and the base of the transistor T813–0 is raised to a potential intermediate between ground potential and —48 volts by the collector of transistor T815–0 via the resistor 819–0 thereby rendering the transistor T813–0 conductive and clamping the base and the collector of the transistor T815–0 at conduction voltage. Thus, the transistor T813–0 locks the transistor T815–0 conductive when the latter has been triggered conductive by the applied negative pulse. The —24 volts at the other stages in the tens register 810 is insufficient to initiate conduction in the transistors associated therewith. With the transistor T815–0 conducting the anode of the diode D821–0 is held at substantially ground potential via the resistor 823–0. At the same time a positive pulse $PP_1$ of a value in the order of 10 volts as shown in curve 1204 of FIG. 12, is applied from the pulse generator 850 to the anodes of diodes D821–1 through D821–0 via the capacitors 818–1 through 818–0, respectively. Thus, at this time $t_1$, the anodes of the diodes D821–1 through D821–9 are at substantially —48 volts and cyclically receive the $PP_1$ pulsations which are not transmitted therethrough. At the same time the anode of diode D821–0 is at substantially ground potential and cyclically receives the positive $PP_1$ pulsations which are transmitted therethrough to provide an output on conductor RT–0 as shown in curve 1205 of FIG. 12.

Similar action takes place in the first, or "1" stage of the calling units register 830 whereby the transistors T837–1 and T836–1 are rendered conductive. The —48 volts on the collector electrode of T836–1 is applied to the cathode of diode D834–1 via the resistor 845–1. Additionally, the negative pulses $NP_1$ from the pulse generator 850 and of a magnitude in the order of 10 volts and of simultaneous occurrence with the pulses $PP_1$ as shown in diagram 1206 of FIG. 12, are applied to the cathodes of diodes D834–1 through D834–0 via the capacitors 833–1 through 833–0, respectively. At this time $t_1$, the cathode of the diode D834–1 in the units register 830 is at substantially —48 volts and the applied negative pulsations $NP_1$ are transmitted therethrough to provide an output on conductor RU–1 as shown in curve 1207 of FIG. 12. At the same time, the cathodes of the diodes D834–2 through D834–9 are at substantially ground potential.

The diodes D821–1 through D821–0 of the calling tens register 810 are connected at the cathodes thereof to the conductors RT–1 through RT–0, respectively, which are in turn connected via the multiple conductor trunk RT to the in-switching matrix 450. Similarly, the anodes of the diodes D834–1 through D834–0 of the calling units register 830 are connected to the leads RU–1 through RU–0, respectively, which are in turn connected through the multiple conductor trunk RU to the in-switching matrix 450. The selectively applied potentials on the conductors RT–1 through RT–0 and RU–1 through RU–0 act to operate corresponding crosspoints in the in-switching matrix 450.

*Section 6.—Operation of the In-Switching Matrix 450*

Figure 4:
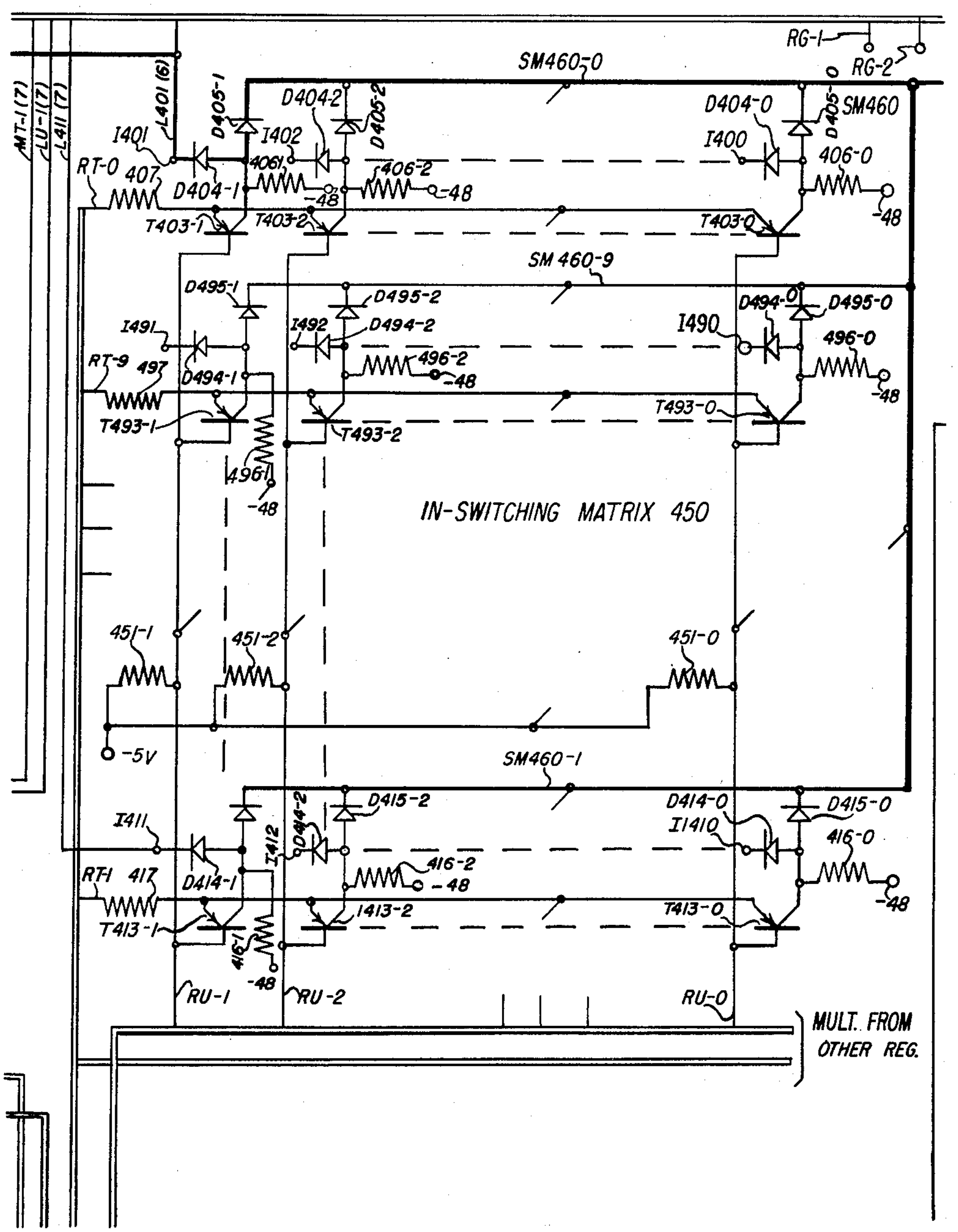

The in-switching matrix 450 comprises one hundred crosspoints respectively corresponding to the subscriber lines in the telephone system for completing a connection for any calling ones of the subscriber lines to the switching matrix output lead SM460. Each of the crosspoints includes a pair of oppositely poled diodes such as, for example, D404–1 and D405–1, a resistor such as 406–1 connected from the junction between the diodes to —48 volts and a transistor T403–1 connected at its collector electrode to the junction between the diodes and the resistor. The emitter electrode of the transistor is connected to the output terminal in the tens register 810 corresponding to the tens digit of the directory number of the subscriber line to which the crosspoint corresponds. Thus, as the crosspoint referred to and illustrated above corresponds to the subscriber line 301 for which the tens digit of the directory number is zero, the emitter electrode of the transistor 403–1 is connected to the output conductor of the "0" stage of the tens register, that is, the conductor RT–0 via the resistor 407. As illustrated in FIG. 4, the emitter electrodes of the transistors T403–1 through T403–0, which are respectively associated with the crosspoints corresponding to the subscriber lines for which the tens digit of the directory number is zero, are all connected to the conductor RT–0 via a resistor 407. Similarly, the output conductor RT–0 from the tens register 810 is connected via the resistor 497 to the emitter electrodes of the transistor T493–1 through T493–0 which are connected to the crosspoints corresponding to the subscriber lines for which the tens digit is nine. From these examples it may be seen that the output conductors RT–8 down through RT–1 are respectively connected to the emitter electrodes of the groups of transistors to which the tens digits of the related subscriber lines correspond.

The base electrode of the transistor T403–1, like the base electrodes of the other transistors corresponding to the subscriber lines for which the units digit of the directory number is one, is connected to the output conductor RU–1 of the units register 830, which conductor is connected to the "1" stage thereof. The output conductor RU–2 from the units register 830 is connected to the base electrodes of the transistors T413–2 through T403–2 associated with crosspoints for which the corresponding subscriber lines have a directory number for which the units digit is two. Similarly, the conductors RU–3 through RU–0 are connected to the base electrodes of the transistors correspondingly associated with the units digits of the directory number three through zero.

Responsive to the application of the potentials on the conductor RT–0 and on the conductor RU–1, the transistor T403–1 is rendered conductive during the periods of the simultaneously occurring negative and positive pulses thereby applying output current to the collector electrode during the periods of the pulsations. Thus, in an exemplary arrangement where the pulses $PP_1$ and $NP_1$ are of a five microsecond duration in each fifty microsecond cycle, the transistor T403–1 will be conductive for five microseconds out of every fifty microseconds and the current flow from the collector electrode will be in the order of 30 ma. as shown by curve 1208 in FIG. 12. Inasmuch as this is the only transistor in the matrix which is pulsed at both the emitter and the base electrode during the $NP_1$ and $PP_1$ intervals, this is the only transistor which will be conductive and the current at the collector is applied to the junction between diodes D404–1 and D405–1 for selective distribution therethrough.

The diode D404–1 is connected at the terminal I401 to the conductor L401 which extends in multiple to the junction between the secondary winding of the transformer TR–1 and the capacitor 336 to the crosspoint in the out-switching matrix 600 associated with the subscriber line 301. The diode D405–1 is connected to the conductor SM460–0 which extends to the in-switching matrix output lead SM460. The lead SM460 extends in multiple to the link circuits including the No. 1 link circuit 500 shown in FIGS. 5, 6 and 10.

At the instant that the transistor T403–1 becomes conductive, substantially all of the current from the collector thereof is applied through the diode D404–1, the conductor L404–1, the secondary winding of the transformer TR1, and the contacts 331F and the base emitter path of the transistor T339 to —24 volts. This transistor is thereby rendered conductive thus clamping the base and collector electrodes at substantially —24 volts. The negative voltage on the base of the transistor T339 establishes an equilibrium potential of —24 volts across the capacitor 336 as illustrated by curve 1209 in FIG. 12. Additionally, the negative voltage on the collector of the transistor T339 biases the base of the transistor T326 nonconductive thereby removing the —24 volts from the junction between the resistors 328A and 328B and the diode D334 and rendering the diode D334 and the transistor T338 nonconductive. Responsive thereto the marking circuits 340 and 360 are released from the line circuit 320 and made available to another of the calling subscriber lines. At the time of release, the conductor MT–0 of the tens marking circuit 340 returns to ground potential and the conductor MU–1 of the units marking circuit 360 returns to ground potential as shown in curves 1202 and 1203 respectively of FIG. 12. Inasmuch as the stages in the No. 1 calling tens register 810 and the No. 1 calling units register 830 corresponding respectively to the conductor MT–0 and MU–1 respectively, are fully conductive they not affected by the release of the marking circuits 340 and 360.

At the same time the capacitor 336 across the secondary winding of the transformer becomes charged so as to bias the diode D404–1 nonconductive and thus permit a current flow through the diode D405–1 during the remainder of the pulse period to the conductor SM460 connected to the link circuits 500, etc. The current so applied to the lead SM460 is receivable only in the one of the link circuits corresponding to the No. 1 calling registers 810 and 830 and which is operated by the same negative pulse $NP_1$ that is applied to the calling register 830. In this instance, as pointed out in Section 2 hereof, the link circuit 500 has been arbitrarily chosen to correspond to the No. 1 calling register and therefore receives at the input control circuit 513 thereof during the period of the applied $NP_1$ pulses the current applied to the lead SM460 from the transistor T403–1 in the in-switching matrix 450. The input control circuit receives the current flow applied thereto and utilizes that current in a manner as described below.

*Section 7.—Operation of the Input Control Circuit 513*

In order to permit the transmission of only the signals from the calling line 301 to a called line, the link circuit 500 includes an input control circuit 513 which is operated in synchronism with the registers 810 and 830 by the negative $NP_1$ pulse. The input control circuit 513 includes the transformer TR2 having a primary and secondary winding and a charging capacitor 506A connected from one terminal of the primary winding to ground potential and a blocking capacitor 506B connected from ground potential to the other terminal of the primary winding. The junction between the capacitor 506A and the primary winding of the transformer TR2 is connected to the conductor SM460 via two oppositely poled diodes D501A and D501B and the current applied to the junction between the diodes is distributed over a path including the resistor 502 to ground potential and a path including the collector electrode of the transistor T503. The base of the transistor is connected to —48 volts and the emitter thereof, normally biased to cutoff, is connected via the resistors 504, 508A and 508B to ground potential thereby preventing a flow of current from the junction of the diodes D501A and D501B through the collector-emitter path of the transistor T503. When the transistor T503 is made conductive, a charge relationship is established between the capacitor 336 of the line circuit 320 and the capacitor 506A of the input control circuit 513.

Further, the calling registers 810 and 830 influence the operation of the input control circuit inasmuch as conduction in any of the stages of registers 810 and 830 draws current through the conductor 844 extending to the emitter electrode of transistor T509. Prior to the operation of the registers, the transistor T509 is at conduction threshold but not drawing current through the emitter-base path thereof. However, at the time that the registers 810 and 830 operate, a large current is drawn through the emitter-base path of the transistor T509 thereby clamping the collector thereof to ground potential. Ground potential on the collector of the transistor T509 biases the base of the transistor T512 nonconductive and, important to the operation of transistor T503, biases the base of the transistor T511 conductive. Conduction in the transistor T511 lowers the potential at the junction between the resistors 508A and 508B to a point substantially below ground potential causing a corresponding decrease in the potential on the emitter of the transistor T503, whereby the transistor T503 is biased to the conduction threshold.

The negative pulses $NP_1$, applied to the No. 1 calling units register 830, are also applied at the same time to the emitter of transistor T503 via the capacitor 505 and resistor 504. The normal positive biasing potential on the emitter of the transistor T503 prevents the pulses $NP_1$ from producing any effect. However, when the emitter is biased to the conduction threshold, the negative pulses $NP_1$ are sufficient to render the transistor T503 conductive during the period thereof whereby a large current supplied mutually or individually through the diodes D501A and D501B flows through the collector-emitter path thereof.

The conduction periods of the transistor T503 in the input control circuit 513 thus coincide with the conduction period of the transistor T403–1 in the in-switching matrix 450 and as substantially all of the current from the transistor T403–1 in its first instant of operation is applied to the line circuit 320, as explained previously, little current is supplied to the diode D501A. Therefore, at this instant, the current to the transistor T503 must be supplied in a path from ground potential via the resistor 507, the primary winding of transformer TR2, and the diode D501B to the collector of the transistor T503. This current flow is sufficient to establish the potential at the junction between resistor 507 and the primary winding at −24 volts and charge the capacitor 506A to the same potential as shown in curve 1210 of FIG. 12.

At this time then, the crosspoint in matrix 450 corresponding to the calling subscriber line, the conductors L401 and SM460, and the input control circuit 513 of the No. 1 link circuit are synchronously pulsed conductive thereby charging the signal transfer capacitors 336 in line circuits 320 and 506A in the input control circuit 513 whereby the calling subscriber line 301 is effectively connected to the No. 1 link circuit 500. Immediately thereafter, the register distributor 910 is operated to assign another pair of calling registers to the marking circuits and the holding circuit 514 in the link circuit 500 is operated to provide a control ground potential.

*Section 8.—Operation of the Register Distributor 910*

As pointed out in Section 1 hereof, the register distributor 910 operates to preselect and assign idle ones of the calling register pairs one at a time to the marking circuits 340 and 360. The operation of the register distributor 910, as described in the preceding Section 7 is in fact controlled by the link circuits 500, etc., associated with the individual pairs of calling registers 810 and 830, etc. The register distributor 910 includes a plurality of stages (of which only two are shown) respectively corresponding to the link circuits in the telephone system, in this case ten stages, which are connected in chain for sequential operation on a one-at-a-time basis.

The operation of the register distributor will be better understood if we assume initially for purposes of illustration that all of the associated links are busy and that all of the stages have been operated. At this time then all of the transistors T925–2 to T925–9 and T927–2 through T927–9 and T928 and T929 are operated. The operation of the last named transistor T929 applies a reset potential of −48 volts to the base of all of the transistors T919–1 through T919–0 via the resistors 923–1 through 923–0, respectively. At the same time, the reset potential is applied to the base of all of the transistors T918–1 through T918–0 via the resistor 913–1 through 913–0 and to the base of the transistor T925–2 via the diode D921–1. If at this time the No. 1 link circuit 500 associated with the first stage of the register distributor 910 should be released and be idie, the conductor IC–1 is marked by a negative marking potential of −48 volts to the emitter of the transistor T914–1 in the first stage. The conjoint application of the reset potential and the negative marking potential to the first stage renders the transistors T914–1 and T919–1 comprising a lock-up circuit conductive thereby causing a flow of current through the diode D922–1 through the resistor 924–1. At the same time, the reset potential biases the transistor T918–1 conductive and causes a current flow through the diode D921–1. As a result, the transistor T918–1 is rendered conductive thereby applying −48 volts to the output conductor RD–1 extending to the calling registers 810 and 830 which effectively assigns the registers to the marking circuits 340 and 360. Current flow through either of the diodes D921–1 and D922–1 renders the transistors T925–2 and T927–2 nonconductive which causes conduction through the diode D921–1 and renders the transistors T925–3 and T927–3 (not shown) nonconductive. This operation is repeated through all of the stages so that transistors T928 and T929 are finally rendered nonconductive. Thereupon the reset potential is removed from all of the stages.

As described in Section 7 hereof, the normally conductive transistor T512 in the input control circuit 513 of the link circuit 500 is biased nonconductive at the base thereof by the large amount of current drawn through the conductor 844 when the registers 810 and 830 are operated by the marking circuits 340 and 360, respectively. When the transistor T512 has been rendered nonconductive, the current flow from the emitter electrode of the transistor T914–1 in the register distributor 910 is interrupted whereby the transistors T914–1, T919–1 and T918–1 are all rendered nonconductive. Thereupon the current flow through the diode D922–1 is interrupted and the transistor T925–2 is rendered conductive along with the transistor T927–2. The collector of the transistor T927–2 is clamped at substantially ground potential and conduction in the diode D921–2 is interrupted. Inasmuch as it has been assumed that none of the lock-up circuits of the other stages of the register distributor 910 have been activated, the transistors T924–2 and T919–2 and the diode D922–2 in the second stage are not conductive and the transistor T918–2 is biased nonconductive. The output conductor RD–2 is thereby maintained at ground potential and the third stage in the distributor 910 is tested for activity by the transistors T925–3 and T927–3 (not shown) being rendered conductive. The testing procedure as described with reference to the second stage is continued through all of the remainder stages to the transistor T928 which is rendered conductive when all of the stages have been operated as indicated by nonconduction in the transistors of the lock-up circuits. Conduction in the last named transistor renders the transistor T929 conductive whereby the reset potential is applied to all the lock-up circuits of the stages. As explained previously with reference to the activation of the first stage, any or all of the stages may be activated at this time by the conjoint application of a negative marking potential to the corresponding input conductors IC–1 through IC–0. Responsive to the activation of any one or all of the stages by conduction of the transistors in the lock-up circuits of the corresponding stages, all of the transistors T925–2 through T925–9 and T927–2 through T927–9 and T928 and T929 will be rendered nonconductive causing the removal of the reset potential. Thereafter, the first one of the activated stages in the chain will be operated.

It is understood that any one of the stages in the register may be activated and operated by the conjointly applied potentials and that only one stage at a time may be operated so that at any given time only one of the output conductors RD–1 through RD–0 will be marked by −48 volts. All of the other output conductors will be at ground potential.

*Section 9.—The Operation of the Holding Circuit 514*

As described in Section 7, responsive to the operation of the input control circuit 513, a −24 volt potential is established at the junction between resistor 507 and the capacitor 506B which in turn operates the holding circuit 514 to generate a holding ground potential used to operate other circuits in the link circuit 500. In particular, the −24 volts at the junction between resistor 507 and capacitor 506B is connected via resistor 518 to the base of transistor T519 whereby the transistor is rendered conductive and the collector electrode thereof is clamped to ground potential. Responsive to ground potential on the collector electrode T519, the emitter electrode of transistor T521 is clamped to ground potential thereby marking the conductor 574 extending to the output terminal HG with holding ground.

Prior to conduction in transistor T519, the transistor T525 is conductive thereby applying ground potential to the base electrode of the transistor T509 in the input control circuit 513. However, responsive to ground potential on the conductor 574 the transistor T531 is rendered conductive at the base thereof whereby the collector is clamped to −48 volts and transistor T525 is rendered nonconductive at the base electrode thereof. At this time, the diode D522 is rendered conductive and current is supplied therethrough from the conductor 574 to the base of the transistor T509. Hence, at this time ground potential has been marked on the conductor 574 and the holding ground output terminal HG and current is supplied to transistor T509, via the diode D522. Responsive to the application of ground to the output terminal HG, the transistor T652 in the switch-through circuit 650 of the link circuit 500 is operated and the first stage of the tens counting chain 1000 and the first stage of the units counting chain 1050 in the link circuit 500 are operated. Conduction in the transistor T652 clamps the emitter electrode thereof to ground potential which is then applied via conductor C674 to the switch-holding ground terminal (SHG) in the sequence switch 540.

The application of ground potential to the switch-holding ground terminal (SHG) in the sequence switch 540 activates the sequence switch for operation through a four step cycle. In its first step, the sequence switch returns dial tone to the corresponding subscriber line and transmits the first group of dialled directory impulses to the tens counting chain 1000; in its second step it transmits the second group of dialled directory impulses to the units counting chain 1050; in its third step it assigns itself and the corresponding link circuit to the ringing control matrix distributor 950, and in its fourth step causes busy tone to be returned to the calling subscriber line. Each of these steps of operation will be considered for purposes of easier understanding, separately and in conjunction with the operation of the associated circuits in the telephone system.

*Section 10.—Operation of the Sequence Switch 540: First Step*

Considering specifically the operation of the sequence switch in its first step, the application of the ground potential to the switch-holding ground terminal (SHG) in the sequence switch 540, operates the first lock-up circuit therein comprising the transistors T560–1 and T562–1. The holding ground applied to the terminal SHG causes a positive going pulse to be transmitted via the capacitor 566 and the diode D568 to the junction of resistors 559–1 and 565–1 thereby instantaneously biasing the transistors T560–1 and T562— conductive and causing the transistors to be rendered conductive by regenerative action therebetween. Thereupon the collector electrode of T562–1 is clamped to —48 volts and the —48 volts is applied to the cathode of diode D536B via the resistor 539B and to the output lead SS1 as shown in curve 1211 of FIG. 12. The application of the —48 volts to the diode D536B renders the diode conductive whereby dial tone is applied via the coupling capacitor 537B and the capacitor 533 to the secondary winding of the transformer TR2 in the input control circuit 513. This dial tone is further extended via the conductor SM460, the in-switching matrix 450 and the line L401 to the subscriber 301, thereby indicating to the subscriber at station 300 that the line is ready to receive the dialled impulses identifying the called subscriber line. The —48 volts on conductor SS1 as shown in curve 1211 of FIG. 12, is applied to the tens counting chain 1000 via the resistor 1004 therein to the cathode of diode D1003 whereby the diode D1003 is biased conductive and the tens counting chain is conditioned to receive the directory impulses corresponding to the dialled first digit of the called subscriber line directory number.

*Section 11.—Dialling of the First Digit of the Directory Number*

In the exemplary telephone system, it is assumed a dialling arrangement having a dial speed of ten pulses per second with a fifty percent make period and a fifty percent break period. Further, the dial is so adjusted that at least 150 milliseconds elapses between the last impulse of one series and the first impulse of a new series. Thus, in a series of impulses corresponding to one of the digits of a directory number, each pulse will be of a 50 millisecond duration as shown in curve 1201 of FIG. 12 and the time lapse between each pulse series will be 150 milliseconds.

Assuming that the party at station 300 is calling, the party at station 710 on the subscriber line 711, which station is identified by the directory number "11," and the party dials at the time $t_2$ the first directory number "1," the contacts 317 are interrupted once. The interruption of the contacts causes the additional impedance of resistor 318 to be added to the circuit whereby the current flow through the circuit will decrease abruptly as shown in curve 1201 of FIG. 12 thereby causing a change in the current flow through the upper and lower primary windings of the transformer TR1. This change in flux through the transformer causes a change in the current flow through the secondary winding which changes the charge on capacitor 336 from the equilibrium potential as shown by the positive going pulse in curve 1209 of FIG. 12. In order to discharge the capacitor 336, a heavy current is drawn through the diode D404–1 causing the current flow through D405–1 to decreases whereby the current flow through D501B is increased causing an instantaneous increase in the current flow through the primary winding of transformer TR2 and an increase in the charge on capacitor 506A as shown by the positive going pulse in curve 1210 of FIG. 12.

At the end of each pulse, as at the time $t_3$, the sudden increase in current flow through the calling subscriber's loop is in a similar manner reflected in the charges on capacitors 336 and 506A by negative going pulses as shown in the curves 1209 and 1210, respectively. Thus, for each dial impulse the capacitor 506A is first charged positive from the negative equilibrium potential and then charged negative from the equilibrium potential causing corresponding charges in current flow through capacitor 533, the base-emitter path of the transistor T534 and the resistor 535 to —48 volts. At the junction of the transistor T534 and the resistor 535 the current changes will again appear as voltage pulses similar to those shown in curve 1210.

*Section 12.—Operation of the Tens Counting Chain 1000*

The positive and negative pulses caused by the dialling of the first directory number, in this case "1," appearing at the junction between the transistor T534 and the resistor 535, are applied via the conductor CC–1 to the tens counting chain 1000.

As pointed out in Section 9, the application of the holding ground potential in the holding circuit 514 to the HG terminal in the tens counting chain 1000 renders the first or "0" stage therein operative. Ground potential applied at the HG terminal therein pulses the base of the transistor T1015–0 conductive over a path including the capacitor 1001 and the diode D1010 and at the same time pulses the transistor T1014–0 conductive thereby regeneratively rendering both transistors of the lock-up circuit comprising the "0" stage conductive. The mode of operation of the stage is substantially identical to that described in Section 10 with reference to the operation of the first lock-up circuit in the sequence switch 540.

The positive and negative dialling pulse on the conductor CC–1 is applied to the diode D1003 in the tens counting chain 1000 which diode has been biased conductive to positive pulses by the conductor SS1 of the sequence switch 540 as described in Section 10. The "0" stage becomes inoperative and the transistors T1014–1 and T1015–1 of the lock-up circuit comprising the next stage become conductive thereby rendering conductive the "1" stage in the tens counting chain 1000 corresponding to the "1" of the tens digit of the dialled directory number "11."

Responsive to conduction in the "1" stage of the tens counting chain 1000, the ground potential at the junction between resistors 1009–1 and 1012–1 is applied via the resistor 1011–1 to the anode of the diode D1021–1 thereby biasing the diode conductive. At the same time, positive pulses $PP_1$, corresponding to those of the calling tens register 810, are applied to the diode D1021–0 through D1021–9 via capacitors 1007–0 through 1007–9, respectively, thereby transmitting through the diode D1021–1 pulses on a pedestal as shown in curve 1213 in FIG. 12. Additionally, the —48 volts at the junction between the collector of the transistor T1015–1 and the capacitor 1020–1 is applied via the resistor 1018–1 to the junction between diode D1016–1 and the capacitor 1019–1 thereby biasing the diode conductive. Conductive biasing of the diode D1016–1 permits the transmission therethrough of the positive pulses $PP_{10}$ shown in curve 1214 of FIG. 13 which are particular to the "1" stage in the tens counting chain 1000 and which are applied via the capacitor 1019–1 to the bus line B1025 extending to the base of the transistor T1005 and to —24 volts via the resistor 1006.

Thus, at the time $t_2$, in the tens counting chain 1000, the voltage on the conductor CC–1 extending from the "1" stage to the out-switching matrix 600 is suddenly changed from —48 volts to ground potential and has superimposed thereon positive pulses in the order of 10 volts corresponding to the pulses $PP_1$ as shown in curve 1213 of FIG. 12. Additionally, the voltage on bus B1025 is changed from —24 volts to approximately ground potential during periods of the pulses $PP_{10}$ as shown in curve 1215 of FIG. 13.

With specific reference to the positive pulse trains $PP_{00}$ through $PP_{90}$, which includes the pulse train $PP_{10}$, the pulses are particular to the stages "0" through "9" respectively. The pulses occur sequentially in time cycles so that at all times at least one of the pulses is being applied from the pulse generator 850 to the diode of the corresponding stage in the tens counting chain 1000 and is utilized in a manner as described in detail hereinafter for ringing the particular one of the subscriber lines called over the link circuit.

A period of 150 milliseconds after the last dialling impulse representing the first digit, that is, the time $t_4$, the tens counting chain 1000 is in its stable operating state. Therefore, the sequence switch 540 has fulfilled the function of its first step of operation and is now operated to its second step.

*Section 13.—Operation of the Sequence Switch 540: Second Step*

Considering now the operation of the sequence switch 540 in its second step, during the period that the tens counting chain is being operated by the dialled directory impulse of the first directory number "1," the positive and negative dialling pulses are being applied to the sequence switch 540 and specifically to the emitter and to the base of the transistors T543 and T545, respectively, via the capacitor 541 and the resistor 542 of the sequence switch 540. The positive pulses applied to these transistors are transmitted via the collector of transistor T543 to the base of transistor T546 and the negative pulses are transmitted and inverted via the collector of transistor T545 to the base of transistor T546. These now positive pulses are transmitted via the emitter electrode of the transistor T546 and applied to the charging capacitor 554 via the resistor 551B and the diode D553 and also applied to the charging capacitor 573. During each pulse, the capacitor 573 is charged to a higher potential than the capacitor 554. Also, the capacitor 573 discharges more rapidly than the capacitor 554 inasmuch as it has a free discharge path through the resistors 551B and 551A whereas the capacitor 554 can discharge only through the emitter-collector path of the transistor T550 which is for the most part held nonconductive by the charge on the capacitor 573. However, the time constant of the capacitor 573 and the resistors 551A and 551B is such that after a period of 150 milliseconds (at the time $t_4$), the capacitor 573 discharges to a level lower than that of the capacitor 554, whereby the transistor T550 is rendered conductive via a path through the emitter-base path of the transistor T550 and the diode D547A. Simultaneously therewith, the transistor T549 is pulsed conductive at the base thereof via the resistor 552A from the collector of the transistor T550, whereby the transistors T550 and T549 are rendered mutually conductive and the capacitor 554 is discharged through the emitter-collector path of the transistor T550. This current pulse is transmitted via the capacitor 555 to the emitter electrode of the transistor T562–1 thereby cutting off this transistor and causing transistor T562–2 to be rendered conductive.

Specifically, nonconduction in the transistor T562–1 changes the potential on the collector electrode thereof from —48 volts to 0 volt which change is transmitted via capacitor 564–1 and resistor 565–2 to the base of the transistor T562–2 and via resistor 559–2 to the collector of transistor T560–2 comprising the second lock-up circuit of the sequence switch 540. Due to regenerative action between the two transistors, the collector electrode of the transistor T562–2 is clamped to —48 volts thereby establishing the first lock-up circuit nonconductive and the second lock-up circuit conductive and establishing the potential of conductor SS2 at —48 volts as shown in curve 1216 of FIG. 13.

Thus, at the time $t_4$, 150 milliseconds after the last dialling impulse in the first digit of the directory number of the called subscriber line, the first called station digit is registered in the tens counting chain 1000 and the CT–1 conductor and bus B1025 therein has been operated accordingly and the tens counting chain has been released from sequence switch and dial tone removed from the subscriber line 301 at the diode D526B. Additionally, —48 volts has been applied to the conductor SS2 as shown in curve 1216 of FIG. 13 whereby the diode D1053 of the units counting chain 1050 is biased conductive at the cathode thereof via resistor 1054. The units counting chain 1050 is then ready to receive dialled directory impulses corresponding to the second digit of the directory number via the secondary winding of the transformer TR2, the capacitor 533, the transistor T534 and the conductor CC–1.

*Section 14.—Dialling of the Second Digit of the Directory Number*

After the time $t_4$, the subscriber at station 300 may dial the second or units digit of the directory number of the called line, in this case "1." The resulting positive impulse at the time $t_5$, and negative impulse at the time $t_6$, as shown in curves 1209 and 1210, are carried over the conductor L401 through the switching matrix 450, conductor SM460 and the input control circuit 513 to the base of the transistor T534 via capacitor 533. As described previously, the impulses will appear at the junction between the emitter of the transistor T534 and the resistor 535.

*Section 15.—Operation of the Units Counting Chain 1050*

The positive and negative pulses caused by the dialling of the second directory number, in this case "1," appearing at the junction between the transistor T534 and the resistor 535, are applied via the conductor CC–1 to the units counting chain 1050.

As pointed out in Section 9, the application of the holding ground potential to the holding circuit 514 to the HG terminal in the units counting chain 1050 renders the first or "0" stage therein operative. Ground potential applied at the HG terminal therein pulses the base of the transistor T1065–0 conductive over a path including the capacitor 1051 and the diode D1056 and at the same time pulses the transistor T1014–0 conductive thereby regeneratively rendering both transistors of the lock circuit comprising the "0" stage conductive. The mode of operation of the stage is substantially identical to that described in Section 10 with reference to the operation of the first lock-up circuit in the sequence switch 540.

The positive and negative dialling pulse on the conductor CC–1 is applied to the diode D1053 in the units counting chain 1050 which diode has been biased conductive to positive pulses by the conductor SS2 of the sequence switch 540 as described in Section 13. The positive pulse transmitted through the diode D1053 and the capacitor 1058 is applied to the bus B1077 as shown in curve 1217 and to the transistor T1065–0 whereby that transistor is rendered nonconductive. The "0" stage becomes inoperative and the transistors T1064–1 and T1065–1 become conductive thereby rendering conductive the "1" stage in the units counting chain 1050 corresponding to the "1" of the units digit of the dialled directory number "11."

Responsive to conduction in the "1" stage of the units counting chain 1050, the —48 volts at the collector electrode of the transistor T1065–1 is applied via the resistor 1071–1 to the cathode of the diode T1070–1 thereby biasing the diode conductive as shown in the curve 1218 of FIG. 13. The cathode of the diodes D1070–0 through D1070–9 all have access to the source of negative pulses NP. However, at this time, the source is not connected to any of the diodes. Additionally, the —48 volts at the collector of the transistor T1065–1 is applied via the resistor 1072–1 to the junction between diode D1066–1 and the capacitor 1073–1 thereby biasing the diode conductive. Conductive biasing of the diode D1066–1 permits the transmission therethrough of the positive pulses $PP_1$ as shown in curve 1219 of FIG. 13 which are particular to the "1" stage in the units counting chain 1050 and which are applied via the capacitor 1073–1 to the bus line B1076 extending via the resistor 1063 to the conductor B1026.

Thus, at the time $t_5$, in the units counting chain 1050, the voltage on the conductor CU–1 extending from the "1" stage to the out-switching matrix 600 is suddenly changed from ground potential to —48 volts and the voltage on bus B1076 is changed from —24 volts to approximately ground potential during periods of the pulses $PP_1$ as shown in curve 1219 of FIG. 13.

With specific reference to the positive pulses $PP_0$ through $PP_9$, which includes the pulses $PP_1$, the pulses are particular to the stages "0" through "9" respectively in the units counting chain 1050. The pulses occur sequentially in timed cycles so that at all times at least one of the pulses is being generated in the pulse generator 850 and applied to the diode of the corresponding stage in the units counting chain 1050 and is utilized in a manner as described in detail hereinafter for ringing the particular one of the subscriber lines called over the link circuit. Additionally, the pulses $PP_0$ through $PP_9$ are of one-tenth the duration and have ten times the frequency of the pulses $PP_{00}$ through $PP_{90}$ so that all of the pulses $PP_0$ through $PP_9$ occur during each of the pulses $PP_{00}$ through $PP_{90}$. Thus, as shown in curve 1218 of FIG. 13, $PP_1$ occurs during the period of pulse $PP_{10}$ to identify at their coincidence the subscriber line for which the directory number is "11."

A period of 150 milliseconds after the last dialling impulse representing the first digit, that is, the time $t_7$, the units counting chain 1050 is in its stable operating state. Therefore, the sequence switch 540 has fulfilled the function of its second step of operation and is now operated to its third step.

*Section 16.—Operation of the Sequence Switch 540: Third Step*

Considering now the operation of the sequence switch 540 in its third step, during the period from $t_5$ to $t_6$, the positive and negative pulsations resulting from the dialling of the units digit "1" are also applied to the input stage of the sequence switch 540 and employed to charge capacitors 554 and 573 in a manner as described in Section 13. At a time $t_7$, 150 milliseconds after the last dialling impulse, the transistor T550 is rendered conductive and capacitor 554 is discharged through the emitter-collector path thereof and capacitor 555 to render the transistors T562–2 and T560–2 nonconductive and to turn on the next succeeding lock-up stage therein (not shown) associated with the conductor SS3. This next stage is identical to the last described stage in sequence switch 540 whereby the conductor SS3 has —48 volts applied thereto as shown in curve 1220 of FIG. 13.

The —48 volts on SS3 extends to the ringing control matrix distributor 950 for the purpose of causing the distributor to assign the identity of the called subscriber line registered in the counting chains 1000 and 1050 to the ringing control matrix 750.

*Section 17.—Operation of the Ringing Control Distributor 950*

Figure 9:
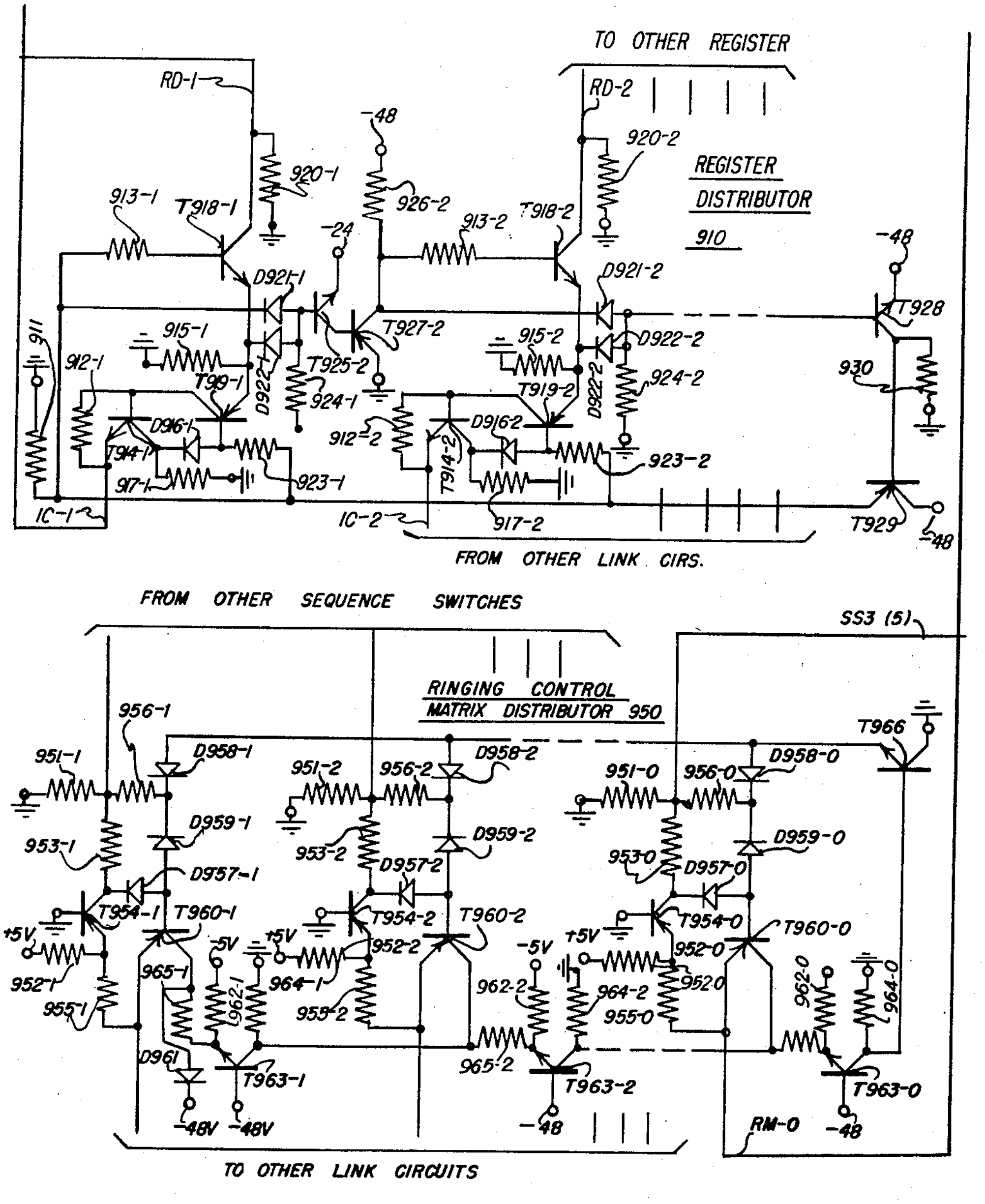

The ringing control distributor 950 comprises a plurality of stages, in this case ten stages, respectively corresponding to the sequence switches 450, etc., in the link circuits 500, etc., and adapted to operate one at a time in response to the application of the —48 volt marking potentials on the conductors SS3, etc. In FIG. 9 only three of the stages are illustrated, though it is understood that the ringing control distributor 950 includes ten stages, and each of the stages is provided with an output conductor RM–0, etc., extending to the switch-through circuit 650, etc., in the corresponding link circuits 500, etc. As the circuit and operation of the ringing control distributor is substantially identical to that of the tens and units marking circuits 340 and 360 of FIG. 3, which are described in detail in Section 4 hereof, only the general operating features will be considered here and for a complete understanding of the operation of the ringing control distributor reference is to be made to Section 4.

Assuming that none of the other stages in the ringing control distributor 950 are operated, the application of —48 volts on the conductor SS3 to the junction between the resistors 951–0, 956–0 and 953–0 in the arbitrarily selected last stage of the ringing control distributor 950 renders the transistor T960–0 conductive whereby the potential on the conductor RM–0 connected to the emitter electrode thereof is changed from ground potential to —48 volts and is held at this potential so long as —48 volts is on the conductor SS3. The conductor RM–0 extends to the switch-through circuit 650 which, responsive to the application of the negative potential on RM–0 thereto, starts a timer in the switch-through circuit and therein provides the tens and units counting chains 1000 and 1050, identifying the called subscriber line with access to the ringing control matrix 750. The operation of the switch-through circuit to provide access to the ringing control matrix 750 is described below whereas the operation of the timer operation of the switch-through circuit will be considered still later.

*Section 18.—Operation of the Switch-Through Circuit 650*

The conductor RM–0 is connected to the junction between the resistors 656, 660, 663 and 664, and responsive to the application of —48 volts thereto, the transistor T659 is biased nonconductive at the base electrode via resistor 660 and a charged capacitor 657 proceeds to discharge through the resistor 656 to —48 volts. The application of —48 volts to the junction between the resistors 663 and 664 biases the cathodes of the diodes D662 and D666 conductive.

Nonconduction in the transistor T659 removes the —48 volt bias from the anode of the diode D658 and the bus B1026 supplied by the collector of the transistor T659 thereby rendering the diode D1059 conductive and applying —24 volts therethrough to the bus B1026. Responsive to —24 volts therethrough to the bus B1026, the transistor T1005 is rendered conductive at the emitter thereof whereupon the bus B1026 is clamped to —48 volts at the emitter of the transistor T1005 and the diode D658 is maintained nonconductive.

During the intervals when the positive pulses corresponding to $PP_{10}$ are applied to the bus B1025 as described in Section 12 and shown in curve 1215 of FIG. 13, the transistor T1005 is rendered nonconductive thereby establishing the anode of the diode D658 at —24 volts via the diode D1059 and the bus B1026 and unblocking the diode D653 for conditioning during the period of the $PP_{10}$ pulse. At the coincidence time between the pulses $PP_1$ and $PP_{10}$, the positive pulses corresponding to the $PP_1$ pulses are applied via the bus B1076, the resistor 1063 and the bus B1026 to the diode D653 whereby the latter is rendered conductive and a pulsation of current is applied therethrough to the ringing signal conductor RS as shown in curve 1221 of FIG. 13. This pulsation is particular to the subscriber line identified by the directory numbers "11," inasmuch as the pulse $PP_{10}$ occurs at a time which is particular to all of the subscriber lines for which the tens digit is "1," and the $PP_1$ pulse occurs at a time which is particular to all of the subscriber lines for which the units digit is "1." Thus, at a time $t_7$ the called subscriber lines have been identified by the counting chains 1000 and 1050 and the switch-through circuit 650 has been operated to apply a current pulse to the conductor RS for operating the ringing control matrix 750 at a time particularly identified with the called subscriber line.

*Section 19.—Operation of the Ring Control Matrix 750*

The ringing control matrix 750 comprises one hundred ringing control conductors RC–11 through RC–00 respectively corresponding to the subscriber lines identified by the directory numbers from "11" through "00." Each ringing control conductor is connected to a −24 volts via a corresponding resistor and applies current thereto from ground potential via a resistor 757 and a diode that respectively corresponds to the individual ringing control conductors. Thus, for the ringing control conductor RC–11, which corresponds to the called subscriber line 711, current will flow in a path from ground potential through the resistor 757, the diode D760A, the conductor RC–11 and the resistor 761A to −24 volts. Additionally, each ringing control conductor may draw current therethrough over two paths extending from ground potential and the pulse generator 850, via diodes individual to the line. The pulse generator applies to one of the diodes connected to each of the conductors the one of the negative pulses $NP_{10}$ through $NP_{00}$, corresponding to the tens digit associated with the ringing conductor and applies to the other diode connected to each of the conductors the one of the negative pulses $NP_1$ through $NP_0$ corresponding to the units digit associated with the ringing control conductor. These pulses $NP_{10}$ through $NP_{00}$ and $NP_1$ through $NP_0$ occur during the same intervals as the positive pulses $PP_{10}$ through $PP_{00}$ and $PP_1$ through $PP_0$, respectively, but are negative with respect thereto. Thus, the ringing control conductor RC–11 may draw current from ground via the resistor 763–10 and the diode D764–10 and from ground via the resistor 763–1 and the diode D764–1 except during the intervals when the pulses $NP_{10}$ and $NP_1$ block conduction through the diodes D764–10 and D764–1, respectively.

In addition to these connections, the ringing control conductors are connected to a variable impedance current source in the line circuit associated with the subscriber line corresponding to the ringing control conductor. Thus, the conductor RC–11 is connected to the base of the transistor T726 in the line circuit 720 which transistor when biased nonconductive is a very high impedance source, larger than the impedance of the above described current paths to the conductor RC–11.

Further, each of the ringing control conductors for the lines not provided with trunk hunting service, and for the last line of a group provided with trunk hunting service, may draw current from ground via a load resistor 756 and diodes corresponding to the individual ringing control conductors. For the others of the ringing control conductors, current may be drawn from ground via load resistor 753 and diodes corresponding to the individual ringing control conductors. Thus, current may be drawn to conductor RC–11 from ground via resistor 756 and the diode D759A, and the ringing conductor RC–12 associated with a line having trunk hunting service may draw current from ground via the resistor 753 and the diode D762. The impedance of resistors 753 and 756 are equal and relatively low but larger than the lowest impedance of the transistor T726 in the line circuit 720 (and corresponding transistors in corresponding line circuits) when the transistor is biased conductive. Thus, in the ringing control conductor RC–11, for example, a constant current is drawn therethrough to the resistor 761A and −24 volts preferably from one or all of the lines to impedance paths including the resistor 757 and the diode D760A, the resistor 763–10 and the diode D764–10 and the resistor 763–1 and the diode D764–1. In the event that all of these paths should be blocked, current will then be drawn from the base of the transistor T726 in the line circuit 720 assuming the connection thereto via contacts 731H is not interrupted and the transistor is biased conductive. In the event that all three of the above mentioned lowest impedance paths are blocked and the path from the base of the transistor T726 is blocked or interrupted, current will then be drawn from ground through the resistor 756 and the diode D759A.

It is through coordinated control of the multiple current paths to the ringing control conductors that a given subscriber line is tested for busy or idle condition and signals are derived for ringing the called idle line or alternately rendering a busy indication. This mode of control is described below.

In Section 18, it was shown how positive current pulsations corresponding in time to a called subscriber line identified by the directory number "11" were applied to the conductor RS and to the ringing control matrix 750. These pulses are applied to the base of the transistor T758. The positive pulsations thereon cause conduction through the base-emitter path to −24 volts thereby causing a greater current through the collector whereby the junction between the collector electrode and the resistor 757 is clamped at −24 volts. The diodes D760A through D760F are thereby blocked from conduction at this time and current flowing in all of the ringing control conductors except RC–11 will be drawn through the other mentioned lowest impedance paths. In the conductor RC–11, the diodes D764–1 and D764–10 will be rendered nonconductive by negative pulses $NP_{10}$ and $NP_1$ respectively applied thereto at the time of the positive pulsation on RS whereby the conductor will then attempt to draw current from the lowest impedance path of the two remaining paths, that is, from the line circuit 720 or the resistor 756 and the diode D759A. If the called line 711 is idle, the lowest impedance path will be through the line circuit 720 and if the called line 711 is busy, the lowest impedance path will be that including resistor 756 and the diode D759A.

Thus, at this time $t_7$, the party at the calling subscriber line 301 has completed the dialling, the directory numbers identifying the called line, these numbers have been registered in the counting chains 1000 and 1050 and the ringing control matrix 750 has been operated in accordance with the dialled directory number to test the called subscriber line 711 for idle or busy condition and responsive to an idle condition to operate the line circuit 720 corresponding to the called subscriber line 711 and responsive to a busy condition to cause a busy signal to be returned to the calling subscriber line.

*Section 20.—Called Line 711 Idle: Operation of the Line Circuit 720*

Assuming that the subscriber line 711 is idle, the circuit through the primary windings of transformer TR3, the conductor 711A, station apparatus 710 and the conductor 711B will be incomplete so that the potential at the junction between the lower primary winding of transformer TR3 and the resistor 732B in the line circuit 720 is at ground potential. The ground potential at the junction between the lower primary winding of transformer TR3 and the resistor 732B is applied to the emitter electrode of the transistor T726. As the collector electrode is connected through resistor 722A and 722B to −48 volts, the transistor T726 is biased at its conduction threshold. Additionally, a connection from the base electrode of the transistor T726 is completed at contacts 731H to the conductor RC–11 extending to the ringing control matrix 750. Thus, as described above, current will be drawn through the emitter base path of transistor T726 and through the conductor RC–11, the resistor 761A, to −24 volts at the time that the positive pulsations identifying the called subscriber line 711 is applied to the conductor RS. Responsive to the current flow through the emitter-base path, the transistor T726 is rendered conductive for the duration of the positive pulsation on the conductor RS thereby causing a large current flow through the emitter-collector path, the contacts 731G and the resistor 722B to −48 volts thereby raising the potential at the junction between resistor 722B and the capacitor 723 and charging that capacitor. After one or more such pulsations on the conductor RS, the capacitor 723 will become sufficiently charged to bias the transistor T721 conductive at the base electrode thereof and operate the relay R730 through the upper winding thereof.

Responsive to the operation of relay R730, the ringing generator conductor RG1 will be connected through the lower winding of relay R730 to the conductor 711B at contacts 731C and the ringing generator conductor RG2 will be connected to the conductor 711A at the contacts 731B, thereby completing a circuit from the ringing generator 860 through the ringer 715, the D.C. blocking capacitor 714 and contacts 713B. The apparatus at station 10 will then be rung.

At the same time the relay R730 interrupts the contacts 731H and 731G thereby interrupting the current flow from the ringing control matrix 750 to the base of the transistor T731. At the same time, a circuit is completed via the contacts 731E and the secondary winding of the transformer TR3 from the conductor L411 to the base of the transistor T721. Inasmuch as this conductor is at this time not connected to a source of current, the transistor T721 becomes nonconductive but as the relay R730 is slugged to make it of the slow-to-release type, the relay R730 remains operated.

In order for the ringing at the subscriber station 710 to continue beyond the release time ($t_9$) of the relay R730, it is necessary that means be provided for reenergizing the relay R730. In particular, this means is provided in a path from the out-switching matrix 600 through the line circuit 720 responsive to the operation of the crosspoint in the out-switching matrix 600 corresponding to the called subscriber line. The operation of the out-switching matrix 600 is facilitated through the operation of the timer in the switch-through circuit 650 which causes the units counting chain 1050 to be connected to the crosspoint in the matrix 600 corresponding to the called subscriber line and also causes the sequence switch 540 to be returned to its inactive state.

The timer operation of the switch-through circuit 650 will be considered in detail below.

*Section 21.—Timer Operation of the Switch-Through Circuit 650*

As pointed out in Section 18 hereof, the application of −48 volts over the conductor RM–0 from the ringing control matrix distributor 950 to the junction of resistors 656, 660, 663 and 664 causes the charged capacitor 657 to discharge through the resistor 656 to −48 volts. The values of capacitor 657 and resistor 656 are chosen so that the capacitor 657 will discharge to a potential sufficient to bias the base of transistor T655 conductive at a time just prior to the restoration time $t_9$ of the slow-to-release relay R730. Conduction in the transistor T655 renders the transistor T653 conductive whereby the base of the transistor T652 is biased nonconductive and the emitter electrode changes from zero volts to −48 volts via the resistor 654. This change in voltage in the emitter electrode is transmitted via the conductor C674 to the resistor 669 to the cathode of the blocking diode D672. The −48 volts on the cathode renders the diode D672 conductive whereby negative pulsations from the source $NP_1$ are applied via the resistors 1069–0 through 1069–9 to the diodes D1070–0 through D1070–9 respectively. As pointed out previously, of these diodes only the diode D1070–1 has been rendered conductive whereby the negative pulsations caused by the source $NP_1$ are transmitted through the diode D1070–1 and the conductor CU–1 to the out-switching matrix 600 as shown in curve 1218 of FIG. 13 for operating the crosspoint therein corresponding to the called subscriber line.

Additionally, the negative pulsations $NP_1$, transmitted through the diode D762 are applied through the capacitor 671 to the emitter electrode of the transistor T667 whereby the collector electrode is clamped at substantially −48 volts. The collector electrode of the transistor T667 extends also to the junction between the cathodes of the diodes D601A and D601B, thereby biasing these last named diodes conductive.

Conduction in the diodes D601A and D601B provides the means for interconnecting the out-switching matrix 600 to the link circuit 500 so that a connection is completed between the calling and called subscriber line. The specific operation of the out-switching matrix in conjunction with the conductive diodes D601A and D601B will be considered now in detail.

*Section 22.—Operation of the Out-Switching Matrix 600*

The out-switching matrix 600 is substantially identical in structure to the in-switching matrix 450 described in Section 6. One hundred crosspoints respectively corresponding to the subscriber lines in the system are arranged to be individually operated by pairs of control conductors extending thereto from the tens counting chain 1000 and the units counting chain 1050. Thus, the conductors CT–1 through CT–0 of the trunk line CT extending to the out-switching matrix 600 compares to the conductors RT–1 to RT–0, respectively, of the trunk line RT extending to the in-switching matrix 450 and the voltages thereon are utilized in the same manner in both matrices. Similarly, the conductors CU–1 through CU–0 of the trunk circuit CU extending to the out-switching matrix 600 compares to the conductors RU–1 through RU–0, respectively, of the trunk line RU extending to the in-switching matrix 450 and the voltages on the individual conductors perform the same functions in the matrices.

Thus, inasmuch as the conductors CT–1 and CU–1 are marked conductors in the trunk lines CT and CU and responsive to the timer operation of the switch-through circuit 650 have the operating pulsations applied thereto, the transistor T612–1 corresponding to the subscriber line 711 is operated. The junction between the diodes D613–1 and D614–1 is clamped at substantially ground potential and has 30 ma. applied thereto. In particular, the diode D613–1 provides a current path from the collector of the transistor T612–1 through the conductor SM620 and the diode D601B to the junction between the collector of the transistor T667 and the resistor 668. The diode D614–1 provides an additional current path from the collector T612–1 via the output terminal O–611 and the conductor L411 to the junction between the capacitor 736 and the secondary winding of the transformer TR3 in the line circuit 720. At this time then, the conductor L441 is connected to a source of current in the out-switching matrix 600. Thereafter, current is supplied to the upper winding of the relay R730 from the conductor L441 over a path including the secondary winding of transformer TR3, the contacts 731E and the base emitter path of the transistor T721 for retaining the relay R730 operated.

Recapitulating, at a time $t_7$ the line circuit 720 was pulsed over conductor RC–11 from the ringing control matrix causing the relay R730 to operate and provide ringing current to the station 710 on the subscriber line 711. Immediately thereafter, the relay R730 was deenergized but because it is of the slow-to-release type, will not release until a predetermined time thereafter $t_7$. It is desired that the relay R730 be reenergized before the time $t_9$ in order to apply ringing current to the subscriber station 710. The timer portion of the switch-through circuit 650 which was started at the time $t_7$ completes its timing function just prior to the time $t_9$ and in the absence of any interrupting pulses, causes the crosspoint in the matrix 600 corresponding to the subscriber line 711 to be operated and renders the diodes D601A and D601B conductive whereby a connection is completed between the link circuit 500 and out-switching matrix 600. The operation of the one crosspoint provides current through the line circuit 720 to energize the relay R730 prior to time $t_9$ whereby the relay is retained operated and the ringing current is provided to the station 710 continuously.

Inasmuch as the operated transistor T667 in the switch-through circuit 650 makes a constant current demand on the diodes D601A and D601B and the current source to the diode D601B is interrupted by virtue of the application of the large amount of current from the out-switching matrix 600 to the line circuit 720, the current to the transistor T667 is supplied through the diode D601A from the holding circuit 514 of the link circuit 500. This current demand on the holding circuit 514 performs the last control function in the link circuit for completing the operation of the link circuit 500 to provide service between the calling and called subscriber lines.

*Section 23.—Further Operation of the Holding Circuit 514*

Responsive to this initial current demand through the diode D601A, current is drawn through the secondary winding of the transformer TR2 from the base of the transistor T520 via the resistor 516 in the holding circuit 514. This current flow causes the capacitor 580 to be charged to substantially −24 volts.

In the holding circuit 514, the current demand on the base of the transistor T520 renders that transistor conductive thereby making transistors T523, T526 and T530 conductive in that order. When the transistor T530 becomes conductive, the emitter electrode thereof is clamped at zero potential and extended to the holding ground conductor 574. Hence, responsive to an interconnection between the subscriber line 301 and the called subscriber line circuit 720, the holding circuit 514 is further operated to apply a second holding ground potential to the output terminal HG. The second holding ground potential on the terminal HG provides for last party release operation of the connection equipment i.e. the registers, the link circuit and the matrices employed in completing the call will not be released until both parties have interrupted their loop connections. The link circuit 500 has at the time $t_7$ completed its linking cycle of operation and is in a condition to complete a talking connection between the calling and called subscriber lines.

*Section 24.—Idle Called Line Answers Call*

Assuming that the party at the station 710 answers at a time $t_{10}$ in response to the ringing, a loop is completed from the telephone instrument 712 through contacts 713A, conductor 711B, contacts 731C, the lower winding of relay R730, the ringing generator conductor RG–1, the ringing generator 860, the ringing generator conductor RG–2, contacts 731B and conductor 711A. The direct current component of the ringing current energizes the lower winding of the relay 730 in opposition to the upper winding thereby restoring the relay R730 and interrupting the loop through the ringing generator 860 at the contacts 731B and 731C and at the same time a loop through the primary windings of the transformer TR3 at the contacts 731A and 731D. In addition, contacts 731E are interrupted and contacts 731F are completed thereby connecting the junction between the secondary winding of transformer TR3 and the capacitor 735 to the base of the transistor T739. The loop completed through the line circuit 720, the subscriber line 711 and the station apparatus 710 is identical to that completed through line circuit 320, subscriber line 301 and station apparatus 300. Therefore, the voltage at the junction between the resistor 732B and the lower primary winding of the transformer TR3 in the line circuit 720 is substantially −24 volts. Responsive to ground potential applied over conductor L411 from the out-switching matrix 600, and the −24 volts from the resistor 732B, the transistor T739 draws current through the base-emitter path thereof and is thereby rendered conductive. Conduction in the transistor T739 biases the transistor T729 nonconductive at the base thereof, thereby preventing the line circuit 720 from appearing as calling over the conductor LT–1 extending to the marking circuit 340. At this time then, the connection between the station 300 on subscriber line 301 is completed through to the station 710 on the called subscriber line 711 and the transmission of speech signals between the stations may take place.

*Section 25.—Transmission of Speech Signals Between Stations*

As explained in Section 11 with respect to the dialling of the directory number of the called subscriber station, the changes in impedance of the calling loop including subscriber line 301 causes a variation in the charge on the bridging capacitors 336 and 506A which in turn influences the current flow in the link circuit 500. The same effect is experienced when the impedance of a loop is varied at either of the connected stations due by speaking into the talking instrument.

By way of illustration, if we assume that beginning at a time $t_{11}$, the current flow through the loop of subscriber line 301 is increased according to a sinusoidal function as shown in curve 1201, the potential across the capacitor 336 will be increased, that is, tend toward −48 volts, in a sinusoidal function as shown in curve 1209. Then during the next operative period of the transistor T403–1 in the in-switching matrix 450 current will be supplied therefrom via the diode D404–1 to the capacitor 336 for a greater portion of the operative period in order to discharge the capacitor and current will be applied via the diode D405–1, conductors SM460–0 and SM460, and the diode D501A to the collector of the transistor T503 for a lesser portion of the operative period. Thus, more current is drawn from the capacitor 506A through diode D501B and the potential of the capacitor is increased, that is, it tends towards −48 volts as shown in curve 1210. Responsive thereto the increased current through the primary of transformer TR–2 increases the current flow in the secondary of the transformer TR–2 and through the diode D601A thereby decreasing the charge on the bridge capacitor 580 and also the current flow from the transistor T612–1 via the diode D613–1, the conductor SM620 and the diode D601–B. The current flow from the transistor T612–1 via the diode D614, and conductor L411 to the line circuit 720 is increased thereby increasing the current flow through the secondary winding of the transformer TR3 and ultimately in the loop of the line circuit 720, subscriber line 711 and station 710 as shown in curve 1224 of FIG. 13.

From the foregoing, it may be easily understood that when the current flow is decreased in the loop of the subscriber line responsive to speech, such as at time $t_{12}$, a similar exchange in potentials and current flow through the system will occur so that the potentials on the capacitors 336, 506A and 936 will decrease, that is, tend towards 0 volts as shown in curves 1209, 1210 and the current flow through the loop of the line circuit 720, subscriber line 711 and the station 710 will decrease as shown in curve 1224.

Inasmuch as the system is symmetrical as between connected stations, the foregoing effects will be the same for speech signals impressed at either station and the exchange of information will continue until the talking connection is interrupted.

For a more thorough understanding of the functioning of the transmission system according to the invention the following detailed analysis thereof may be helpful.

In the embodiment disclosed in the application the multiplex-type two-way transmission circuit according to the invention is used in two places: it is used on the finder side to interconnect, via common highway SM460, the transmisson path (TR–2, FIG. 5) of the particular link (500) employed in a given connection with the transmission path (L401) of the particular line circuit that is in calling condition, and it is used on the connector side to interconnect, via common highway SM620, the transmission path (TR–2) of that link with the transmission path (L411) of the particular called line.

In the following detailed analysis of the new transmission system reference will be had, by way of example, to the transmission circuit on the finder side and it will be assumed that transistor T403–1 of IN-switching matrix 450 (which transistor corresponds to the particular calling line) has already been marked under the control of calling tens register 810 and calling units register 830.

In FIG. 15 the transmission circuit just referred to is illustrated in schematic form. The reference numerals shown in FIG. 16 are the same numerals that have been used for corresponding parts in the detailed circuit diagrams of FIGS. 3, 4, 5 and 8.

As described in column 10 of the specification, transistor T403–1 which, in the assumed example, is the only transistor in the matrix that is pulsed at both emitter and base, is rendered conductive during each of the $NP_1/PP_1$ intervals. Transistor T403–1 (like all the other gate-controlling transistors) is connected in a degenerative common-emitter circuit so that during the pulse "ON" period a substantially constant current flows in the collector circuit of this transistor, see curve 1208, FIG. 12. The value of this current which is determined by the amplitude of the control pulses and the value of resistance 407, has been assumed to be 30 ma.

A small fraction of the collector current flows through 4061 to negative battery, but the major portion divides the two paths. One path is through D404–1, one winding of TR–1, break contacts 331F and the emitter circuit of T339 to —24 v. The other path is through D405–1 to the common highway SM460, thence through D501A and the collector circuit of T503 to —48 v. T503 is pulsed "ON" in synchronism with T403–1 at this time by reason of a change in emitter bias on T503 resulting from conduction in T511. Since T403–1 is a p-n-p type transistor whereas T503 is an n-p-n type, their collector currents flow in opposite directions. A small fraction of the T503 collector current flows through 502, but the major portion divides between two paths. The path from common highway SM460 through D501A was traced above, the other path is from ground through 507, one winding of TR–2 diode D501B and the collector circuit of T503 to negative battery.

The operation of the transmission system disclosed in the application is dependent on the manner in which the collector current pulses divide in the above-traced paths. When the transistors T403–1 and T503 are first pulsed "ON," the potential at the free end of condenser 336 is —24 v. and that at the free end of condenser 506A is —48 v. (from the emitter circuit of T503).

Initially, diodes D405–1 and D501A remain non-conductive. Hence all of the T403–1 collector current flows through D404–1 into 336 raising the potential of this condenser at its free end, i.e. making the potential of 336 more positive (condenser 336 discharges). Similarly all of the T503 collector current flows through D501B from 506A, lowering the potential of this condenser at its free end, i.e. making the potential of 506A more negative (condenser 506A charges). In the intervals between pulses currents flow in the D.C. paths shunting these capacitors in the directions tending to neutralize the effects of the current pulses. Incidentally, since the resistance of the path shunting 336 is relatively low compared to that shunting 506A, the neutralization will be more complete for 336. Consequently, the charge on 506A is altered far more than that on 336.

The value of resistance 507 preferably is chosen high, in relation to the magnitude of the collector current pulses, so that in the absence of diodes D405–1 and D501A the potential at the free end of condenser 506A would eventually approach negative battery. The presence of these diodes prevents the alteration of charge from progressing appreciably beyond the point where the free ends of these capacitors are at the same potential since beyond this point these diodes become conductive and thereby shunt current from the collector of T403–1 into the collector of T503. This point, i.e., the point where the charges on the capacitors bridging the transmission circuit are substantially equal, will hereinafter be referred to as the equilibrium point. In the absence of signal voltages etc., this point lies in the neighborhood of —24 v., but obviously this point is not constant; instead it is affected by the relative resistances of the shunting paths, by the presence of supervisory signals and by the presence of speech signals or dialling impulses.

The values of capacitors 336 and 506A preferably are chosen as high as possible, the limiting value being determined by the permissible attenuation of the highest signal frequency which must be transmitted. Capacitors 335 and 506B preferably are high-value units which provide low impedance by-pass circuits for speech signals, thus allowing only the D.C. component of the signal transmitted from the line circuit to appear across 507. The voltage developed across 507 is used to control holding circuit 514 in the connector.

Both speech and impulsing signals are transmitted over the multiplex circuit in the same manner. However, it is preferred to transmit only the upper harmonics of impulsing signals rather than the entire frequency spectrum so as to reduce the size and cost of the transformers in the transmission circuit. In the following discussion the term "signals" is intended to apply to either, or both, impulsing and speech signals. Incoming signals appearing across line conductors 301A, 301B are reproduced across condenser 336 by TR–1. This transformer may have a step-up ratio of 4:1, for example, whereby the nominal line impedance of, say, 600 ohms is transformed to approximately 10,000 ohms on the office side. A source impedance in this order of magnitude is desirable to obtain efficient transmission through the transistor-rectifier matrix, due to limitations of the circuit elements used therein. Transformer TR–2 may have a one-to-one ratio and it will be assumed that it also presents an impedance of 10,000 ohms to the matrix. This is actually the case upon completion of a connection, but the impedance may either be higher or lower during setting up of a connection.

For purposes of explanaion, let it be assumed that a 1000 cycle sinusoidal wave having a peak amplitude of 2 volts is impressed on the line circuit through a 600 ohm resistor. During the intervals between the multiplex pulses the voltage across condenser 336 follows the signal, being influenced briefly by each of the twenty pulses occurring during a signal cycle. The voltage at the free end of 336 thus swings from —20 volts to —28 volts in a generally sinusoidal wave studded by 20 steps during which the voltage heads toward the mean value of —24 volts. The circuit constants are preferably chosen so that under no-signal conditions current flows from the collector of T403–1 through D404–1 during the first half of the pulse period and flows through D405–1 during the second half. Similarly, current flows from 506A through D501B during the first half and from D405–1 through D501A to the collector of T503 during the second half. The presence of the signal voltage on condenser 336 influences the point in the pulse period at which current switches from one path to the other in the following manner. As the voltage on 336 swings positive the voltage difference between 336 and 506A at the start of a pulse is reduced, hence less time is required to reach the equilibrium point. In consequence, the average current (over a pulse cycle) flowing from T403–1 into condenser 336 is reduced and results in a corresponding reduction in the average current flowing out of condenser 506A. The voltage across 506A thus also swings positive. As the voltage on 336 swings negative the voltage difference between 336 and 506A at the start of a pulse increases, hence more time is required to reach the equilibrium point. The average current flowing into 336 thus increases causing a correspinding increase in the average current flowing out of 506A. The voltage across 506A thus follows that across 336 in the negative direction.

Signals coming from the connector, which may be either supervisory tone signals or speech signals from the called subscriber's transmitter, appear across 506A and are transferred to 336 by the multiplex circuit in the same manner as just described for the reverse direction of transmission.

Reverting to the point in the operation when the multiplex (transmission) circuit on the finder side of the link "switches through" it will noted that calling line circuit 320 is reset to non-calling condition by virtue of the current flowing over the multiplex and through the emitter path of transistor T339. The collector of T339 is consequently clamped to −24 volts, thereby cutting off transistor T326 to release marking circuits 340 and 360.

At the link end of the transmission circuit, the −24 volts appearing at the free end of resistor 507 as the result of the above-described operation of the line finder multiplex, causes T519 to bottom its collector at ground potential. The emitter of T521 follows its base to ground, thereby swinging the HG lead from negative battery to ground to prepare the tens and units counting chains of the connector for operation. Ground on HG also causes T531 to bottom its collector at negative battery, thus disabling T525. The line finder holding ground is now obtained from lead HG (i.e. through transistor T521) by way of diode D522 instead of from the emitter of T525. The ground on HG is also applied to the sequence switch holding conductor C674 through transistor T652.

*Section 26.—Interrupting a Completed Connection at Station 300*

Assuming that at the completion of a call at time $t_{13}$, the party at the station 300 on the subscriber line 301 hangs up first, the loop through the line circuit 320 is interrupted thereby changing the potential at the junction between the resistor 332B and the lower primary winding of the transformer from −24 volts to ground potential thereby biasing the transistor T339 nonconductive and permitting the capacitor 336 to discharge to ground potential as shown in curves 1209. In the matrix 450, the diode D404–1 is thereby rendered nonconductive and all of the current flow from the transistor T403–1 is applied via the diode D405–1 and the diode D501A to the transistor T503. The diode D501B is rendered nonconductive and accordingly the capacitor 506A discharges through the primary winding of the transformer TR–2 and the resistor 507 to ground potential as shown in curve 1210. Subsequently, the transistors T519 and T521 in the holding circuit 514 are rendered nonconductive thereby removing one of the two holding ground potentials from the conductor 574. Thus, interrupting the loop at the station 300 only, disconnects the line circuit 320 from the matrix but maintains the registers 810 and 830 operative as well as the link circuit 500 by virtue of the hold ground maintained on the terminal HG by the closed loop through the station 710, the subscriber line 711 and the line circuit 720.

*Section 27.—Interrupting a Completed Connection at Station 710*

Assuming that the completed connection between the subscriber lines 301 and 711 is interrupted at the station 710 only, at the time $t_{13}$ the line circuit 720 is released from the matrix 600 according to the above described release of the line circuit 320 from the matrix 450. Accordingly, the current from the transistor T612–1 in the out-switching matrix 600 is all applied to the transistor T667 via the diode D613–1, the conductor SM620 and the diode D601B thereby cutting off the current flow through the diode D601A and discharging the capacitor 580 to ground potential and interrupting the current flow through the secondary of the transformer TR–2. Responsive thereto, the base of the transistor T520 is biased nonconductive thereby rendering nonconductive the transistors T520, T523, T526 and T530 and removing the ground potential from the emitter of the transistor T530 which is connected to the conductor 574.

Thus, responsive to opening of the loop at the station 710, the line circuit 720 is released from the connection and one of the two holding grounds is removed from the holding ground conductor 574 but the register circuits and link circuits are retained operated by virtue of the hold ground maintained on the output terminal HG by the closed loop through the station 300, the subscriber line 301 and the line circuit 320.

*Section 28.—Interrupting the Completed Connection at Stations 300 and 710*

As described in Sections 26 and 27, the interruption of the loop at the call initiating one of said stations removes the one corresponding ground from the terminal HG in the holding circuit 514 and interruption of the loop at the called station removes the other corresponding ground from the terminal HG in the holding circuit 514. It makes no difference at what time or in what order the loops are interrupted, the holding grounds will be removed as described above and not until both holding grounds are removed will the switching apparatus be completely released and made available for other calls.

Release of the switching apparatus is initiated in the holding circuit 514 at the time $t_{13}$, as shown in FIG. 13, when both holding potentials are removed from the conductor 574 and the holding ground terminal HG. Removal of ground potential from the terminal HG interrupts the current flow to the tens and units counting chains 1000 and 1050, respectively, to which these chains are connected thereby rendering the operated stages therein inoperative. Responsive thereto, the transistor T612–1 in the outswitching matrix 600 is rendered inoperative.

Additionally, at the time that the ground potentials are removed from the conductor 574 in the holding circuit 514, the diode D522 is rendered nonconductive thereby interrupting for an instant the current supply to the base of the transistor T509 and the current from the emitter of the transistor T509 to the conductor 844 in the input control circuit 513. The interruption of the current flow through the conductor 844 causes the operated stages in the registers 810 and 830 connected thereto to be rendered inoperative thereby blocking conduction in the transistor T403–1 of the in-switching matrix 450.

Thus, at an instant after the last of the two interconnected loops are interrupted, the No. 1 calling registers 810 and 830 are inactive, the counting chains 1000 and 1050 in the No. 1 link circuit 500 are inactive, the crosspoints in the in-switching matrix 450 and the out-switching matrix 600 corresponding to the calling and called lines respectively are inactive and the line circuits 320 and 720 are available for initiating calls or receiving calls. Until a further recovery operation takes place, the No. 1 registers 810 and 830 and link circuit 500 will remain inactive and unavailable for the transmission of other calls. This recovery operation takes place in the holding circuit 514.

When ground is removed from the conductor 574, the transistor T531 is rendered nonconductive thereby unclamping the collector of the transistor T531 and the base of the transistor T525 from −48 volts. The base of the transistor T525 then tends toward ground potential and conduction is restrained by the capacitive charging process taking place in the capacitor 529. After the capacitor is charged, the transistor T525 is rendered conductive and current is supplied to the conductor 844 via the transistor T509 awaiting the assignment of another calling station thereto. Responsive to the application of current to the base thereof, the collector electrode of the transistor T509 draws some current through the base-emitter path of the transistor T512 thereby clamping the emitter and the conductor IC–1 at −48 volts. Thus, the stage in the register distributor 910 to which the conductor IC–1 is connected is signalled that the No. 1 registers 810 and 830 and the No. 1 link circuit 500 are available for use in routing another call from a calling subscriber line to a called subscriber line.

*Section 29.—Called Line Busy*

Assuming that at the time $t_7$ instead of the called subscriber line 711 being idle as in the situation just described, the called station 711 is busy and the loop between the station 710, the subscriber line 711 and the line circuit 720 is already completed. Then, in the line circuit 720, the emitter of the transistor T726 will be biased nonconductive at −24 volts. Therefore, the line circuit 720 would present a high impedance to the conductor RC–11 in the ringing control matrix 750. Current is then drawn from ground potential via the resistor 756 and the diode D759A causing a negative voltage pulse at the junction between the resistor 756 and the diode D759A. The negative pulse biases the base of the transistor T754 conductive whereby the collector potential and the potential on the conductor BY changes from −48 volts to a lesser negative voltage for the duration of the pulse. Hence, each time a ringing pulse corresponding to the subscriber line 711 is applied over the conductor RS to the ringing control conductor RC–11 during a period when the subscriber line 711 is busy, the potential on conductor BY will change from −48 volts to a lesser negative voltage as shown in curve 1225 of FIG. 13. The conductor BY extends from the ringing control matrix 750 to the switch-through circuit 650 wherein the diode D666 has been rendered conductive by the application of −48 *volts* thereto over the conductor RM–1 and the resistor 664. Positive pulses applied to the conductor BY are transmitted via the diode D666, the capacitor 665 and the conductor CC–1 to the junction between the resistor 535 and the collector electrode of the transistor T534 at the input of the sequence switch 540. Inasmuch as this action takes place prior to time $t_9$ and before the capacitor 657 has had an opportunity to discharge to the conduction level for the transistor T655, the sequence switch 540 is still operative. The positive pulse impressed on the junction at the input to the sequence switch 540 charges the capacitors 554 and 573 in the sequence switch 540 in a manner as described previously in Section 13. The transistor T550 then becomes conductive a period of 150 milliseconds after the pulse and transmits a positive pulse via capacitor 555 to the transistor T562–3 (not shown) in the third stage of the sequence switch. This pulse renders the third stage nonconductive and turns on the fourth stage whereby −48 volts is impressed on the conductor SS4.

At the time $t_8$ that the third stage of the sequence switch 540 is rendered nonconductive, the last stage of the ringing control matrix distributor 950 is also rendered nonconductive whereby the potential on conductor RM–0 is changed from −48 volts to ground potential. Ground potential on RM–0 biases the transistor T659 conductive at the base electrode thereof via resistor 660 thereby rendering diode D658 nonconductive and interrupting the flow of ringing pulses to the ringing control matrix 750 via conductor RS. Additionally, ground potential on conductor RM–1 charges capacitor 657 via resistor 656 thereby maintaining the transistor T652 conductive and the sequence switch 540 operative.

The −48 volts on the conductor SS4 biases the diode D536A conductive whereby at the time $t_8$ the signal from a busy tone source as shown in curve 1226 of FIG. 13 is transmitted via the capacitor 537A, the diode D536A, capacitor 533, input control circuit 513, conductor SM460, in-switching matrix 450, conductor L401 and the line circuit 320 to the subscriber line 301 and the telephone instrument 312 at the station 300 thereon.

Responsive to the busy tone at the station 300, the subscriber thereat operates the switchhook to interrupt contacts 313A thereby opening the loop through subscriber line 301 to the line circuit 320. When the loop is thus opened to the line circuit 320, −24 volts is removed from the junction between resistor 332B and the lower primary winding of transformer TR–1 thereby rendering the heretofore conductive transistor T339 nonconductive and removing −24 volts from the base electrode thereof. Responsive to nonconduction in the transistor T339, the capacitor 336 is discharged to ground potential and the diode D404–1 is rendered nonconductive. Thereafter, all of the current impressed on the junction of the diodes D404–1 and D405–1 is transmitted via the diode D405–1, the conductor SM460–0, the conductor SM460 and the diode D501A to the collector electrode of transistor T503. Current flow through the diode D501B ceases and causes the capacitor 506A to discharge to ground potential via the resistor 507. The resulting ground potential on the base of the transistor T519 in the holding circuit 514 renders the transistors T519 and T521 nonconductive whereby the single ground potential on the conductor 574 is removed. Accordingly, and as described in Sections 26 and 27, with reference to the interruption of the call at the stations 300 and 710, the calling registers 810 and 830 and the counting chains 1000 and 1050 are released and the crosspoints in the matrix 450 and the matrix 600 correpsonding to the calling and called subscriber lines, respectively, are rendered inoperative. Additionally, the removal of ground potential from the HG terminal in the switch-through circuit 650 renders the transistor T652 nonconductive thereby removing ground potential on the emitter electrode thereof from the conductor C674 extending to the SHG terminal in the sequence switch 540. Accordingly, the sequence switch is rendered inoperative and the −48 volts on the conductor SS4 is returned to ground potential at a time $t_{14}$. A short time thereafter, the calling registers 810 and 830 and the register distributor 910 are prepared to function with another calling subscriber line. At this time, subscriber line 301 may be called by another subscriber line or may initiate another call, and the No. 1 calling registers 810 and 830 and the No. 1 link circuit 500 may be made available to another calling subscriber line by the register distributor 910.

*Section 30.—Trunk Hunting Service*

As explained in Section 19, provision is made in the ringing control matrix 750 for providing selected subscriber lines with trunk hunting service. Specifically, it was noted that the subscriber lines corresponding to the ringing control conductors RC–12 and RC–13 are provided with trunk-hunting service. Assuming that the subscriber line corresponding to the conductor RC–12 is called, the subscriber line, if idle, will be rung in the normal manner as described previously. However, should the subscriber line be busy, the units counting chain 1050 will be operated responsive thereto to remove the ringing signal from the conductor RC–12 and to apply the ringing signal to the conductor RC–13. The mode by which this change in ringing signals is accomplished is described below.

The conductor RC–12 is connected via a diode D762 to the junction between a resistor 753 extending to ground potential and the base electrode of transistor T751. A busy condition on the called subscriber line having the directory numbers "12" causes a current flow from ground through resistor 753 and diode D762 to the conductor RC–12 whereby the base electrode of transistor T751 is biased conductive and the collector electrode is raised from —48 volts to a less negative voltage for the duration of the ringing pulse and extended to the trunk hunting conductor TH. As the diode D662 has been rendered conductive previously at the cathode thereof by virtue of the —48 volts applied via the conductor RM–1 and the resistor 663, the positive going pulses are transmitted via the conductor TH, the diode D662, the capacitor 661 and the conductors 673 to the bus B1077 in the units counting chain 1050. At this time, the "2" stage of the units counting chain 1050 is operative and the positive going pulse applied to the counting chain through the capacitor 1058 renders the "2" stage nonconductive and renders the "3" stage conductive. Thus, ringing control pulses are applied to the ringing control conductor RC–13 via the bus B1076, the bus B1026, the diode B658 and the conductor RS thereby causing the subscriber line corresponding thereto to be tested for busy or idle conditions. If the subscriber line is idle, the station thereon will be rung. Should the subscriber line be busy, the diode D759B will be rendered conductive and positive pulses applied to the busy conductor BY causing a busy tone to be returned to the calling station in a manner as described in Section 29.

It is appreciated that the testing of the called station via conductor RC–12 the switching action in the units counting chain 1050 and the subsequent testing of the conductor RC-13 takes place during the interval $t_7$ to $t_9$ that the capacitor 657 in the switch-through circuit 650 is discharging and prior to the time $t_9$ when it will normally discharge to the conduction voltage of the transistor T655.

*Section 31.—Alternative Distributor Circuits and Their Operation*

In the foregoing detailed description in Sections 4 and 17 of the automatic telephone system, the operation of the one-at-a-time distributor circuit used in the tens marking circuit 340, the units marking circuit 360 and the ringing control matrix distribution 950 is at times hampered because the order of preference between the stages of the circuits proceeds from the "1" stage through the "0" stage. Should the "1" and the "0" stages both be marked at the same time, the "1" stage would gain preference, and, similarly, if during the operational period of an intermediate stage, the input conductor to the "0" stage should be marked and subsequently the input conductor to the "1" stage should be marked, the "1" stage would be preferred and actually be the next operated stage. Thus, the circuits connected to stages having a low order of preference may be subject to long waiting periods during heavy traffic periods.

An additional embodiment of a one-at-a-time distributor circuit which substantially overcomes the above described objections and which may be substituted for the marking circuits 340 and 360 and the ringing control matrix distributor 950 is shown in schematic form in the circuit 1400 of FIG. 14. Therein, the lock-up circuit associated with each of the ten stages (of which only the "1" and the "0" stages are shown) are identical to those shown in, and described with reference to, the marking circuit 340 and are therefore identified by the same reference characters. For example, the lock-up circuit of the first stage of the circuit 1400 is identical to that of the first stage of the circuit 340 and comprises the transistors T342–1 and T347–1, the diodes D344–1, D345–1 and D346–1, and the resistors 341A–1, 341C–1, 343A–1 and 343B–1. From the foregoing it may be recalled that in a stage, the "1" stage for example, the transistor T342–1 in the lock-up circuit is conductive and the transistor T347–1 is nonconductive prior to the application of a negative voltage (—24 volts) to the conductor LT–1. Responsive to the negative voltage, the transistor T347–1 is rendered conductive over a first path including the resistor 341A–1 and the diode D346–1 causing the transistor T342–1 to become nonconductive. Thereafter, the transistor T347–1 is operated over a second path including the resistor 341C–1 and the diode D344–1.

The locking-out operation of the remainder of the stages in the circuit is substantially the same as in the marking circuits 340 and 360 in that the diodes D345–1 through D345–0 are rendered conductive in order to interrupt the first paths to the stages. However, the means for facilitating conductivity in the diode D345–1 through D345–0 is changed in order to provide a time delay between the operation of the transistor T347–1 and the interruption of the first paths to all of the stages. This time delay permits any of the other stages in the circuit to be operated during the period of the time delay. In order to permit the marking of but one of the output conductors MT–1 through MT–0 at a time, particularly when more than one of the stages are operated, each of the stages except the last has associated therewith a lock-up circuit all of which are connected in chain for sequential operation. So that in the distributor 1400 of FIG. 14 more than one stage can be operated at a time but only one of the output conductors of the operated stages can be marked at a time and these output conductors are marked sequentially according to the numbered positions of the operated stages in the circuit 1400. Thus, a group of stages may be operated during the period of the time delay and the corresponding output conductors will be marked successively until none of the stages remain operated, whereupon the distributor will permit another group of stages to be operated and so on.

With specific reference to this changed mode of operation, conduction in any one of the transistors T347–1 through T347–0 clamps the collector thereof at substantially ground potential thereby rendering the transistor T1411 in the control portion of the circuit conductive and establishing the collector thereof at —48 volts. The capacitor 1414 is then charged exponentially via the resistor 1413 from 0 volts to —48 volts which change in voltage is transferred via the base-emitter path of the transistor T1415 and the resistor 1416 to the base of the transistor T1417. At a predetermined time thereafter, the voltage on the base will have increased sufficiently to clamp the collector of the transistor T1417 to ground potential whereupon the diodes D345–1 through D345–0 will be rendered conductive and provide a shunt path for any conductors LT–1 through LT–0 marked thereafter whereby the corresponding stages will be prevented from operating. During the period between operation of the "1" stage and the charging of the capacitor 1414 to the predetermined potential any or all of the other stages in the circuit may be operated and the output conductors MT–1 through MT–0 corresponding to the operated stages will be marked in their numerical order before any additional stages in the distributor 1400 may be operated. Specifically, in each of the stages operated during the given period, the transistor therein corresponding to the transistor T347–1 will be operated so that the collector thereof will maintain the capacitor 1414 charged and the transistor T1417 conductive until all of the operated stages are released.

In addition to transferring the charging voltage on capacitor 1414 to the transistor T1417, the transistor T1415 transfers the charging voltage to the emitter of the transistor T1406–1 and via the resistor 1403–1 to the base of the transistor T1402–1 which transistor pair comprises the lock-up circuit associated with "1" stage. Each of the lock-up circuits is connected via the collector of the transistor T1406–1, etc., and the resistor 1407–1, etc., to the junction between resistor 1403–2, etc., and the emitter of transistor T1406–2, etc., except in the last stage which has associated therewith only the transistor T1402–0.

Conduction in the transistor T347–1 biases the transistor T1406–1 nonconductive and the transistor T1402–1 conductive whereby the emitter thereof is clamped at −48 volts by the current flow through the resistor 1401–1 and the emitter-base path of the T1402–1 and transferred to the output terminal MT–1.

Subsequently, when the negative marking voltage is removed from the conductor LT–1, the transistor T347–1 becomes nonconductive thereby biasing the transistor T1402–1 nonconductive and biasing the transistor T1406–1 conductive. The resulting current flow through resistor 1407–1 and the collector-emitter path of T1406–1, clamps the collector at −48 volts which negative voltage is applied to the transistors T1402–2 and T1406–2 (not shown) in the next or "2" stage. If the "2" stage is operated, the transistor T1402–2 will be biased conductive and the negative voltage will appear on the output conductor MT–2. If the "2" stage is not operated, the transistor T1406–2 will be biased conductive and the collector thereof will be clamped at −48 volts by the current flow through the resistor 1407–2 (not shown) which negative voltage is applied to the next stage. This action is repeated from stage to stage until none of the stages remain operated, whereupon the capacitor 1414 is permitted to discharge and the diodes D345–1 through D345–0 are unblocked. The distributor 1400 is then ready to receive new negative voltage markings on the input conductors LT–1 through LT–0 thereof and initiate a new cycle of operation.

In this manner, even though the fixed order of preference between stages proceeds according to their numerical position in the distributor, the distributor is restricted to marking in the order of preference only those output conductors corresponding to stages operated during a fixed period.

Another embodiment of a one-at-a-time distributor which may be substituted for the marking circuits 340 and 360 and the ringing control matrix distributor 950 is shown in schematic form in the circuit 1500 of FIG. 15. The circuit includes ten capacitively coupled stages 1510–1 through 1510–0 (of which only three stages are shown) that are connected via corresponding input control circuits 1511–1 through 1511–0 to the respectively corresponding input conductors LT–1 through LT–0. Further, each of the stages is connected to the respectively corresponding output conductors MT–1 through MT–0. In addition, all of the input control circuits are commonly connected to a pulse generator 1512 which is connected in turn to all of the stages 1510–1 through 1510–0. The stages each comprise a flip-flop, or bistable multivibrator circuit, of conventional transistor construction and operation, which are connected in chain with one another and connected to the pulse generator 1512 to operate sequentially in a cycle so that one of the stages is always operated, or "on." In this manner, the order of preference between stages always starts at the last operated stage. The pulse generator 1512 may be of conventional relaxation oscillator construction and operated responsive to a marking on any one of the input conductors to generate pulses for triggering the flip-flops. The mode of operation of the one-at-a-time distributor will be understood from the following detailed explanation.

Assume initially that the flip-flop stage 1510–1 is "on" and the remainder of the stages are "off," that none of the input conductors are marked, and that the pulse generator is inactive. With this set of operating conditions, the transistor T1510–1A in the flip-flop 1510–1 is conductive and the transistor T1510–1B is nonconductive. In the flip-flops 1510–2 through 1510–0, the transistors T1510–2A through T1510–0A are nonconductive and the transistors T1510–2B through T1510–0B are conductive. In the flip-flops shown, the collector electrodes of the conductive transistors are clamped at substantially zero volts and the collector electrodes of the nonconductive transistors are clamped at substantially −35 volts. Thus, in the "1" stage, the voltage at the junction between the collector of the transistor T1510–1A and the base of the transistor T1513–1 is substantially zero volts and the transistor T1513–1 is biased for conduction at its base electrode. The other transistors T1513–2 through T1513–0 are biased nonconductive by −35 volts on the base electrodes thereof. If at this time, the conductor LT–1 is marked by −48 volts thereon, the transistor T1513–1 will become conductive in the base-emitter path causing the collector to be clamped at −35 volts. The transistor T1517 is biased conductive so that current flows from ground through the emitter-base path of the transistor T1513–1 and the winding of the relay R1516–1 to −48 volts. The relay is energized and operated causing the contacts 1518–1 to be closed and −48 volts to be applied to the output conductor MT–1. At the same time and incidental to the above described operation, a second current path is established from ground through the emitter-collector path of the transistor T1517, the resistor 1519 and the emitter-collector path of the transistor T1520. Thus, with the "1" stage flip-flop "on," a −48 volts marking on the input conductor LT–1 will cause a −48 volts marking on the output conductor MT–1 without operation of the pulse generator 1512 and the marking will remain on the conductor MT–1 as long as −48 volts is applied to the conductor LT–1.

However, if instead of the conductor LT–1 being marked, or after the marking is removed from the conductor LT–1, the conductors LT–2 and LT–0, for example, are marked simultaneously with −48 volts, a different order of operation takes place. Specifically, current flows from ground through the resistor 1515 and in multiple through the diode D1514–2 and the winding of the relay R1516–2 to the conductor LT–2 and through the diode D1415–0 and the winding of the relay R1516–0 to the conductor LT–0. As the base electrodes of the transistor T1513–2 and the transistor T1513–0 are at substantially −35 volts, very little current flows in its collector-emitter path. The resistor 1515 is chosen to be of a high value so that very little current flows through the diodes and the total currents through the relays are limited to a value insufficient to operate them. The voltage at the junction between the diodes, the base of the transistor T1520 and the resistor 1515 rises to near −48 volts causing the emitter of the transistor T1520 to follow. Current then flows in a path from ground through the resistors 1521 and 1519 and the emitter collector path of the transistor T1520 to −48 volts. The base of the transistor T1512A in the pulse generator 1512 is thereupon biased conductive at substantially −35 volts whereby current flows through the emitter-collector path and the collector is raised from −48 volts to near ground potential. The positive going change in voltage on the collector is transmitted via the capacitor 1522 to the base of the transistor T1512B whereby the transistor T1512B is pulsed nonconductive and the collector voltage goes negative from substantially 0 volt to near −48 volts. This change in voltage is transmitted via the capacitor 1523, the transistor T1524 and the capacitor 1525 and appears on the conductor C1525 as a negative pulse. The negative pulse switches "off" the flip-flop 1501–1 in a manner well understood in the art thereby rendering the transistor T1510–1A nonconductive and the transistor T1510–1B conductive. Responsive to the switching action in the flip-flop 1510–1, the flip-flop 1510–2 is switched "on" via the capacitor 1527–1 in a manner well understood in the art thereby rendering the transistor T1510–2A conductive and the transistor T1512–2B nonconductive. When the flip-flop 1510–2 is switched "on" the base of the transistor T1513–2 swings from −35 volts to near ground potential causing the emitter to follow and support a current flow in a path from ground potential via the emitter base of the transistor T1517, the collector-emitter of the transistor T1513–2 and the winding of the relay R1516–2 to −48 volts on the conductor LT–2. At the same time, current flows from ground via the emitter-collector of the transistor T1517 and the resistor 1519 to the transistor T1520 thereby shunting the resistor 1521 and removing the operating biasing voltage from the base of the transistor T1512A in the pulse generator 1512. The pulse generator 1512 then returns in a manner well understood in the art to its "inactive" state with the transistor T1512A nonconductive and the transistor T1512B conductive.

The energized relay R1516–2 operates and closes contacts 1518–2 thereby extending −48 volts to the conductor MT–2. This potential is maintained on the conductor MT–2 as long as the conductor LT–2 is marked by −48 volts. Removal of −48 volts from the conductor LT–2 restores the relay R1516–2 thereby removing −48 volts from the conductor MT–2 and rendering the transistors T1513–2 and T1517 nonconductive.

Assuming that the conductor LT–0 is still marked by −48 volts and no intermediate circuits have been marked, the transistor T1520 will remain conductive and current will then be drawn through the resistor 1521 thereby applying the operating bias to the transistor T1512A in the pulse generator 1512. As the pulse generator 1512 is of the relaxation oscillator type, it will generate negative pulses at spaced time intervals as long as the operating bias is applied to the transistor T1512A which pulses are applied to conductor C1526. The flip-flops in the chain are operated in sequence until the "0" stage is reached whereupon the transistors T1513–0 and T1517 are operated causing the operating bias to be removed from the pulse generator 1512. At the same time the relay R1516–0 is operated and −48 volts is applied to the output conductor MT–0 at the contacts 1518–0. When the −48 volts is removed from the conductor LT–0, the −48 volt marking is caused to be removed from the conductor MT–0 but the flip-flops 1510–0 remains "on" and the other flip-flops 1510–0 through 1510–9 remains "off" until one of the input conductors other than LT–0 is marked to renew the cycle of operation.

*Section 32.—Conclusions*

In view of the foregoing, it is apparent that there has been provided an improved substantially electronic automatic telephone system wherein novel signal transmission means, switching circuits and ringing circuits in cooperation with semiconductor devices have facilitated the utilization therein of a simplified time multiplex transmission system.

Note that while voice transmission is on a time division multiplex basis in recurring time slots individual to the links; many of the control functions occur on a space division basis, such as those relating to the detection of a service request from a calling line and the use of the one-at-a-time marking circuits to set the tens and units registers in response to the calling condition. This is in contrast to many other telephone systems in which a calling condition causes a train of pulses to appear on a control conductor in a recurring time slot individual to the line. In the claims the term "potential" refers to a lasting, or space division type, of signal condition.

While there has been described what is, at present, believed to be the preferred embodiment of the invention, it will be understood that various modifications may be made therein, and it is intended to cover in the appended claims the described embodiment and all such modifications as fall within the spirit and scope of the invention.

What is claimed is:

1. In a time division multiplex telephone system, a group of line circuits each having a transmission gate for calls originating at said line circuit and a separate transmission gate for calls terminating at said line circuit, a group of finder-connector links each having a single pulse time position individually assigned thereto and each having a transmission gate on its finder side and a separate transmission gate on its connector side, a common two-way transmission conductor between said line circuit gates for originating calls and said finder gates and a separate common two-way transmission conductor between said line circuit gates for terminating calls and said connector gates, each link having individually associated therewith a calling-line register and a separate called-line register, a common electronic in-switching matrix with input connections from all of the calling-line registers and individual output connections to the originating-call gates of the line circuits, a common electronic out-switching matrix with input connections from all of the called-line registers, and individual output connections to the terminating-call gates of all of the line circuits, electronic means for enabling both the finder gate and the connector gate of the link used in a given connection in the one pulse time position of said link, the originating-call gate of the calling line corresponding to the registration in the calling-line register of that link being selectively enabled by means of the in-switching matrix in said one pulse time slot of the link, and the terminating-call gate of the called line corresponding to the registration in the called-line register of that link being selectively enabled by means of the out-switching matrix in said one pulse time position of that link, whereby said two line circuits are effectively connected for two-way voice transmission over a path including said finder-side transmission conductor, said link and said connector-side transmission conductor in series.

2. In a time-division multiplex system, the combination as claimed in claim 1, wherein each of said line circuits includes a storage capacitor common to its two said transmission gates, and means in each line circuit comprising said capacitor and the enabled one of said transmission gates for effectively connecting the line circuit to the corresponding common transmission conductor for transmission in both directions.

3. In a time division multiplex system, a plurality of subscriber lines each having connected thereto at one end a substation and at the other end a line circuit, a plurality of finder circuits, a transmission gate connected to each said line circuit, a transmission gate connected to each said finder circuit, a common transmission conductor between said line circuit gates and said finder gates, resistance means in each line circuit for developing in said line circuit a calling potential upon the initiation of a call at the corresponding substation, means responsive to said calling potential for causing an idle one of said finder circuits to be taken into use and coincident trains of enabling pulses to be applied to the gate of said calling line circuit and the gate of said finder circuit, thereby to effectively connect said calling line circuit to said finder circuit for voice transmission over said common conductor, and transistor means connected to the transmission gate of said line circuit and responsive to the current flowing through the last-mentioned gate incident to the corresponding enabling pulses for resetting said calling potential in said line circuit.

4. In a time division multiplex system, the combination as claimed in claim 3, further including transistor means connected to the transmission gate of said finder circuit and responsive to the current flowing through the last-mentioned gate incident to the corresponding enabling pulses for causing said finder circuit to be held under the control of the calling line over said common conductor after said calling potential has been reset.

5. In a time division multiplex system, a plurality of subscriber lines each having connected thereto at one end a substation and at the other end a line circuit, a plurality of finder circuits, transmission equipment including a transmission gate in each said line circuit, transmission equipment including a transmission gate in each said finder circuit, resistance means in each line circuit for developing in said line circuit a calling potential upon initiation of a call at the corresponding substation, means responsive to said calling potential for causing an idle finder circuit to be taken into use and coincident trains of enabling pulses, one train of one polarity and the other train of the opposite polarity, to be respectively applied to the gate of said calling line circuit and the gate of said finder circuit, thereby to effectively connect said calling line circuit to said finder circuit for two-way voice transmission over said common conductor and transistor means connected to the transmission gate of said line circuit and responsive to the current flowing through the last-mentioned gate incident to the corresponding train of enabling pulses for resetting said calling potential in said line circuit.

6. A one-at-a-time marking circuit having a plurality of pairs of input and output conductors, each input and output conductor having a controlling and controlled circuit connected thereto respectively, said one-at-a-time marking circuit including a plurality of transistor lock-up circuits each interposed between the input conductor and the output conductor of the corresponding pair, and including a chain of semiconductor devices interlocking said transistor lock-up circuits so that responsive to the application by any number of said controlling circuits of an input potential to the corresponding input conductors an output potential is effectively connected to only one of the output conductors corresponding to the last-mentioned input conductors, said output potential being effectively removed from said one output conductor responsive to the removal by the respective controlling circuit of the input potential from the corresponding input conductor.

7. A one-at-a-time marking circuit as claimed in claim 6 further including semiconductor interlock means, the input of said interlock means being connected to the end of said chain and its output to the input end of each of said lock-up circuits so that if said input potential is simultaneously applied to the input conductors of any number of said lock-up circuits, only that one of the last-mentioned lock-up circuits which is farthest removed from said end of the chain is permitted to lock up depending on the respective input potential while all other lock-up circuits are effectively withdrawn by said interlock means from the control of their respective input conductors.

8. In a telephone system, a group of lines and corresponding line circuits, register means for registering the identity of any calling one of said lines, resistance means in each line circuit for developing in said line circuit a calling potential upon the initiation of a call on the corresponding line, a one-at-a-time marking circuit having a plurality of pairs of input and output conductors, each input conductor being connected to the corresponding line circuit and each output conductor being connected to said register means, said one-at-a-time marking circuit including a plurality of transistor lock-up circuits each interposed between the corresponding input conductor and the corresponding output conductor, and including a chain of semiconductor devices interlinking said transistor lock-up circuits so that responsive to the application by any number of said line circuits of said calling potential to the corresponding input conductor a register-marking potential is connected to only one of the corresponding output conductors, said marking potential being removed from said one output conductor responsive to the removal by the respective line circuit of the calling potential from the corresponding input conductor.

9. In a telephone system, the combination as claimed in claim 8, wherein said register means include a plurality of registers, to all of which said output conductors are connected, and wherein there is provided an allotter for selecting an idle one of said registers, said allotter having a plurality of busy-indicating conductors each connected to and controlled by the corresponding register, having a plurality of allotting conductors each connected to the corresponding register and having means controlled by said busy-indicating conductors for applying an allotting potential to the allotting conductor corresponding to an idle one of said registers, and circuit connections between said allotting conductors and said register-marking conductors such that the identity of said line is registered in one of said registers in response only to the simultaneous application of a register-marking potential to one of said output conductors and of an allotting potential to one of said allotting conductors.

10. In a telephone system, the combination as claimed in claim 9, wherein said allotter includes a plurality of switching stages, one for each of said registers, each stage being interconnected with the corresponding register by said busy indicating conductors and said allotting conductors, and each stage having a semiconductor lock-up circuit controlled by the corresponding busy-indicating conductor, said allotter also including a chain of semiconductor elements interlinking said stages, and transistor means in each stage jointly governed by the semiconductor elements of said chain and by the lock-up circuit of said stage for controlling the application of said allotting potential to the corresponding allotting conductor whereby, upon one of said registers being taken into use, an allotting potential is automatically applied to the allotting conductor corresponding to the next idle register in the chain.

11. In a telephone system, a group of lines and corresponding line circuits, each being part of a corresponding first-coordinate subgroup and a corresponding second-coordinate subgroup, register means for registering the first- and second-coordinate identity of any calling one of said lines, resistance means in each line circuit for developing in said line circuit a calling potential upon the initiation of a call on the corresponding line, a first-coordinate marking circuit having pairs of first-coordinate input and output conductors, a second-coordinate marking circuit having pairs of second-coordinate input and output conductors, means connecting each said input conductor to the line circuits of a corresponding coordinate subgroup so that each line circuit is connected to one first-coordinate and one second-coordinate input conductor, means connecting the first- and second-coordinate output conductors to said register means, means in each line circuit for applying a control potential to its first-coordinate input conductor responsive to said calling potential, said first-coordinate marking circuit comprising means responsive to the application of control potential to any number of first-coordinate input conductors for connecting a register-marking potential to only one of the corresponding first-coordinate output conductors, each line circuit including transistor means jointly controlled by said calling potential and the marking potential on the corresponding first-coordinate output conductor for applying a control potential to the corresponding second-coordinate output conductor, and said second-coordinate marking circuit comprising means responsive to the application by the transistor means of any number of said line circuits of a control potential to the corresponding second-coordinate input conductors for connecting a register-marking potential to only one of the correspondingq second-coordinate output conductors, whereby in the case of overlapping calls the correct registration of the first and second-coordinate identity of only one calling line at a time is insured.

12. In a telephone system the combination as claimed in claim 11 wherein each of said marking circuits includes a plurality of transistor lock-up circuits each interposed between the input conductor and the output conductor of the corresponding pair, and includes a chain of semiconductor devices interlinking said transistor lock-up circuits so that responsive to the application by any number of said line circuits of a control potential to the corresponding input conductors a marking potential is connected to only one of the corresponding output conductors, said marking potential being removed from said one output conductor responsive to the removal by the respective line circuit of the control potential from the corresponding input conductor.

13. In combination, a plurality of utilization circuits, an electronic distributor for allotting an idle one of said circuits, said distributor including a plurality of switching stages, one for each of said circuits, a busy-indicating conductor and an allotting conductor interconnecting each stage with the corresponding utilization circuit; each stage comprising a lock-up circuit having a first state and a second state, first and second gating means, a chain-in and a chain-out conductor, an output conductor from the lock-up circuit being connected to one input of each of the gating means, and the chain-in conductor being connected to another input of each of the gating means, the chain-in conductor having either a first or a second condition signal thereon, each stage except the last having its chain-out conductor connected to the chain-in conductor of the succeeding stage, each lock-up circuit being arranged so that it can be in the first state only with an idle indicating condition on the corresponding busy-indicating conductor and is switched to the second state in response to a busy indicating condition on the busy-indicating conductor, each stage being so constructed and arranged that in response to the lock up circuit being in the first state in coincidence with a first condition signal on the chain-in conductor allotting potential is applied to the corresponding allotting conductor responsive to the output of the first gating means, and a second condition signal is applied to its chain-out conductor responsive to the output of the second gating means, and in response to either the lock-up circuit being in the second state or a second condition signal on its chain-in conductor allotting potential is not applied to the corresponding allotting conductor and a second condition is applied to its chain-out conductor, whereby, upon one of said utilization circuits being taken into use, an allotting potential is automatically applied to the allotting conductor corresponding to the next idle utilization circuit in the chain, irrespective of whether any of the preceding utilization circuits has in the meantime returned to idle.

14. The combination as claimed in claim 13, further including means responsive to a second condition signal on the chain-out conductor of the last stage for resetting to the first state the lock-up circuits of all stages having idle indicating signals on their busy-indicating conductors.

15. The combination as claimed in claim 13, wherein each said lock-up circuit includes a pair of transistors of opposite conductivity type, each transistor having a base, an emitter and a collector, circuit connections between the base of each transistor of any pair and the collector of the other transistor of the pair, and wherein the emitter of one transistor of a pair is connected to the corresponding busy-indicating conductor and the emitter of the other transistor of the pair is connected to said output conductor from the lock-up circuit which is connected to one input of each of the gating means.

16. A one-at-a-time marking circuit having a plurality of pairs of input and output conductors, each input and output conductor having a controlling and controlled circuit connected thereto, respectively; said one-at-a-time circuit including a plurality of transistor lock-up circuits each interposed between the input conductor and the output conductor of the corresponding pair, including a chain of semiconductor devices interlinking said transistor lock-up circuits so that upon application by any number of said controlling circuits of an input potential to the corresponding input conductors only one of the operated lock-up circuits at a time may become effective to connect an output potential to the corresponding output conductor under the control of the respective input conductor; including a semiconductor gate interposed between each said input conductor and its corresponding lock-up circuit; and including transistor means for closing said gates under the control of operated ones of said lock-up circuits, to prevent the operation of further lock-up circuits while permitting the already operated lock-up circuits to be made effective, one-at-a-time, in the order of preference determined by said chain and for opening said gates responsive to the last of the already operated lock-up circuits having been made effective, whereby said controlling circuits are served by said one-at-a-time circuit in batches.

17. A one-at-a-time marking circuit as claimed in claim 16, further including a resistance-capacitance circuit interposed between said lock-up circuit and said transistor means so that said gates are closed by said operated lock-up circuits with a predetermined delay.

18. In a telephone system of the time division multiplex type, a plurality of subscriber lines and corresponding line circuits, a group of connectors each comprising a register controlled by digital signals received from a calling one of said lines for registering the designation of a called one of said lines, a transmission gate connected to each said line circuit, a transmission gate connected to each said connector, a common transmission conductor between said line circuit gates and said connector gates, a busy test matrix of static switching devices, common to said connectors and connected to said line circuits, a distributor for effectively connecting said common matrix with said connectors on a one-at-a-time basis, a pulse generator for producing repetitive pulses in different time positions, said pulse generator being connected to said matrix and also being connected under the control of said distributor to one of said connectors, keying means in each said register for delivering to said matrix under the control of said distributor a repetitive pulse in the time position corresponding to said designation of the called line, semiconductor means connected to said matrix and jointly controlled by the last-mentioned pulse received from the register of said one connector and a coincident pulse received from said pulse generator for testing the called line circuit as to its busy or idle condition.

19. In a telephone system of the time division multiplex type, the combination as claimed in claim 18, further comprising means controlled by said register and said matrix which, if the called line has been tested idle, cause coincident trains of enabling pulses to be applied to the gate of said called line circuit and the gate of said connector.

20. In a telephone system, the combination as claimed in claim 18, including gate means controlled by said semiconductor means for causing a busy signal to be applied to said calling line if said called line is busy.

21. In a telephone system, the combination as claimed in claim 18, wherein at least certain of said lines are trunks arranged in groups, said combination further including semiconductor apparatus connected to said matrix in effective circuit connection with all the trunks except the last of a group, means including said apparatus responsive to one of the trunks of said group testing busy, for advancing said register to a position corresponding to the next following trunk whereby said matrix is caused to test the last-mentioned trunk for its busy or idle condition.

22. In a telephone system, the combination as claimed in claim 18, wherein said lines are divided in a first-coordinate group and a second-coordinate group, wherein said combination further includes an arrangement in said pulse generator for furnishing said repetitive pulses to both said register and said matrix as a group of relatively staggered first-coordinate pulses of long duration and a group of relatively staggered second-coordinate pulses of short duration, wherein said register includes an arrangement for causing the pulse delivered by the keying means of said register to said matrix to be transmitted in the time position determined by the coincidence of the long first-coordinate pulse which corresponds to the first-coordinate association of said called line, with the short second-coordinate pulse which corresponds to the second-coordinate association of said called line.

23. In a telephone system of the time division multiplex type, the combination as claimed in claim 19, wherein each said line circuit comprises a switching device for connecting ringing current to the called line, said device being operated under the control of said matrix if said called line is idle, and a locking circuit completed by said device and traversed by the current flowing through said line circuit gate incident to the corresponding enabling pulses for holding said device operated independently of said common matrix.

24. In a telephone system of the time division multiplex type, the combination as claimed in claim 23, wherein said switching device is in the form of a differential relay having two windings, the relay being operated under the control of said matrix over one of said windings to connect ringing current to the called line by way of the other winding, and said relay being released responsive to the line direct current flowing through the last-mentioned winding upon answering, whereby said ringing current is disconnected from said line.

25. In a telephone system, means for transmitting a plurality of series of dial impulses, inductive means for producing voltage surges of opposite polarity at the beginning and end, respectively, of each said impulse, and means for detecting the termination of a received impulse series, said detecting means comprising means for inverting the voltage surges of a predetermined polarity, thereby to produce a series of voltage surges of identical polarity and of twice the dialling frequency, a resistance-capacitance network on which the last-mentioned series of voltage surges is impressed, and means controlled by said resistance-capacitance network for producing a change-over signal a predetermined time after the end of the last-mentioned series.

26. In a telephone system, means for transmitting a plurality of series of dial impulses, inductive means for producing voltage surges of opposite polarity at the beginning and end, respectively, of each said impulse, and means for detecting the termination of a received impulse series, said detecting means comprising a transistor for inverting the voltage surges of a predetermined polarity, thereby to produce a series of voltage surges of identical polarity and of twice the dialling frequency, a resistance-capacitance network, including two capacitors separated by a rectifying device, on which the last-mentioned series of voltage surges is impressed, and a transistor trigger circuit controlled by the difference of potential of said capacitors for producing a change-over signal at the end of the last-mentioned series.

References Cited in the file of this patent

UNITED STATES PATENTS

| | | |
|---|---|---|
| 2,619,548 | Lesti | Nov. 25, 1952 |
| 2,629,020 | Robertson | Feb. 17, 1953 |
| 2,727,094 | Flowers et al. | Dec. 13, 1955 |
| 2,761,903 | Der Hertog | Sept. 4, 1956 |
| 2,827,516 | Morris | Mar. 18, 1958 |
| 2,892,035 | Trousdale | June 23, 1959 |
| 2,894,072 | Abbott et al. | July 7, 1959 |
| 2,921,137 | Morris et al. | Jan. 12, 1960 |